(12) United States Patent
Matsushita

(10) Patent No.: US 11,941,045 B2
(45) Date of Patent: Mar. 26, 2024

(54) IMAGE SEARCHING APPARATUS, IMAGE SEARCHING METHOD, AND STORAGE MEDIUM

(71) Applicant: CANON KABUSHIKI KAISHA, Tokyo (JP)

(72) Inventor: Masahiro Matsushita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/095,870

(22) Filed: Nov. 12, 2020

(65) Prior Publication Data

US 2021/0165818 A1 Jun. 3, 2021

(30) Foreign Application Priority Data

Nov. 28, 2019 (JP) .................. 2019-215596

(51) Int. Cl.
| | | |
|---|---|---|
| *G06F 16/55* | (2019.01) | |
| *G06F 16/532* | (2019.01) | |
| *G06F 16/538* | (2019.01) | |
| *G06F 16/583* | (2019.01) | |
| *G06F 18/21* | (2023.01) | |
| *G06F 18/22* | (2023.01) | |
| *G06V 10/74* | (2022.01) | |

(52) U.S. Cl.
CPC .......... *G06F 16/583* (2019.01); *G06F 16/532* (2019.01); *G06F 16/538* (2019.01); *G06F 16/55* (2019.01); *G06F 18/2178* (2023.01); *G06F 18/22* (2023.01); *G06V 10/761* (2022.01)

(58) Field of Classification Search
CPC ...... G06F 16/532; G06F 16/55; G06F 16/538; G06F 16/535

USPC ........................................... 707/722
See application file for complete search history.

(56) References Cited

U.S. PATENT DOCUMENTS

| | | |
|---|---|---|
| 9,582,518 B2 | 2/2017 | Shiiyama et al. |
| 9,594,981 B2 | 3/2017 | Sorakado et al. |
| 9,916,521 B2 | 3/2018 | Matsushita et al. |
| 9,996,554 B2 * | 6/2018 | Yano ..................... G06F 16/583 |
| 10,055,822 B2 | 8/2018 | Matsushita et al. |
| 10,217,010 B2 | 2/2019 | Shiiyama et al. |
| 10,353,954 B2 | 7/2019 | Matsushita et al. |
| 10,664,523 B2 | 5/2020 | Shiiyama et al. |

(Continued)

OTHER PUBLICATIONS

J.J. Rocchio "XXIII Relevance feedback in information retrieval" ISR-9 (Aug. 1965) pp. 1-18.

*Primary Examiner* — Kimberly L Wilson

(74) *Attorney, Agent, or Firm* — Carter, DeLuca & Farrell LLP

(57) ABSTRACT

There is provided with an image searching apparatus. A searching unit searches a plurality of search target images for an image relating to a query image based on a first similarity to the query image by a first evaluation scheme. A first obtaining unit obtains a feedback indicating correct or incorrect regarding the searched image. A second obtaining unit obtains an evaluation of an effect of changing a similarity evaluation scheme to a second evaluation scheme from the first evaluation scheme in accordance with the feedback. A control unit controls, in accordance with the evaluation of the effect, a search of the plurality of search target images for the image relating to the query image based on a second similarity to the query image by the second evaluation scheme.

18 Claims, 15 Drawing Sheets

(56) References Cited

U.S. PATENT DOCUMENTS

| | | |
|---|---|---|
| 10,762,133 B2 | 9/2020 | Matsushita et al. |
| 2010/0262612 A1* | 10/2010 | El-Saban .............. G06F 16/951 |
| | | 707/E17.015 |
| 2014/0365506 A1* | 12/2014 | Gong ...................... G06F 16/24 |
| | | 707/748 |
| 2019/0205472 A1* | 7/2019 | Kulkarni ............. G06F 3/04812 |
| 2019/0266262 A1* | 8/2019 | He .......................... G06N 3/045 |
| 2019/0294999 A1* | 9/2019 | Guttmann ............. G06F 18/217 |

* cited by examiner

FIG. 2A

<QUERY IMAGE> 201

| | QUERY |
|---|---|
| SHIRT | DIAGONAL STRIPES |
| BAG | BLACK |
| AROUND NECK | BLACK |

FIG. 2B

<SEARCH RESULT DISPLAY> 205

FIRST PAGE 202, 203

| | 1 | 2 | 3 | 4 | 5 | 6 | 7 | 8 | ... |
|---|---|---|---|---|---|---|---|---|---|
| SHIRT | DIAGONAL STRIPES | DIAGONAL STRIPES | | | DIAGONAL STRIPES | | DIAGONAL STRIPES | | |
| BAG | NONE | BLACK | | | BLACK | | BLACK | | |
| AROUND NECK | BLACK | BLACK | | | DOTS | | BLACK | | |

207  206 (208)  209  214

THIRD PAGE

| | 101 | 102 | 103 | 104 | 105 | 106 | 107 | 108 | ... |
|---|---|---|---|---|---|---|---|---|---|
| SHIRT | HORIZONTAL STRIPES | | | | DIAGONAL STRIPES | | | | |
| BAG | BLACK | | | | BLACK | | | | |
| AROUND NECK | BLACK | | | | BLACK | | | | |

210  211

UNRANKED

| | — |
|---|---|
| SHIRT | DIAGONAL STRIPES |
| BAG | BLACK |
| AROUND NECK | BLACK |

FIG. 3A

<FEEDBACK CONTENT: FIRST TIME>

| | FB-1 |
|---|---|
| SHIRT | DIAGONAL STRIPES |
| BAG | NONE |
| AROUND NECK | BLACK |

CORRECT
● INCORRECT — 312

FIG. 3B

<RE-RANKING RESULT DISPLAY: FIRST TIME>

| FIRST PAGE | 1 | 2 | 3 | 4 | 5 | 6 | 7 | 8 | ... |
|---|---|---|---|---|---|---|---|---|---|
| SHIRT | DIAGONAL STRIPES | | DIAGONAL STRIPES | DIAGONAL STRIPES | DIAGONAL STRIPES | | | | |
| BAG | BLACK | | BLACK | BLACK | BLACK | | | | |
| AROUND NECK | BLACK | | DOTS | BLACK | BLACK | | | | |

<FEEDBACK CONTENT: SECOND TIME>

| | FB-2 | |
|---|---|---|
| SHIRT | DIAGONAL STRIPES | |
| BAG | BLACK | |
| AROUND NECK | DOTS | |

206

○ CORRECT
● INCORRECT — 314

FIG. 3D

<RE-RANKING RESULT DISPLAY: SECOND TIME>

| FIRST PAGE | 1 | 2 | 3 | 4 | 5 | ... | 38 | 39 | ... |
|---|---|---|---|---|---|---|---|---|---|
| SHIRT | DIAGONAL STRIPES | DIAGONAL STRIPES | DIAGONAL STRIPES | | | | HORIZONTAL STRIPES | DIAGONAL STRIPES | |
| BAG | BLACK | BLACK | BLACK | | | | BLACK | BLACK | |
| AROUND NECK | BLACK | BLACK | BLACK | | | | BLACK | BLACK | |

<FEEDBACK CONTENT: THIRD TIME>

| | FB-3 |
|---|---|
| SHIRT | (HORIZONTAL STRIPES) |
| BAG | BLACK |
| AROUND NECK | BLACK |

∘ CORRECT
● INCORRECT —— 416

<RE-RANKING RESULT DISPLAY: THIRD TIME> 208

| FIRST PAGE | 1 | 2 | 3 | 4 | 5 | ... | 38 | 39 | ... |
|---|---|---|---|---|---|---|---|---|---|
| SHIRT | DIAGONAL STRIPES | | DIAGONAL STRIPES | DIAGONAL STRIPES | | | DIAGONAL STRIPES | | |
| BAG | BLACK | | BLACK | BLACK | | | BLACK | | |
| AROUND NECK | BLACK | | BLACK | BLACK | | | BLACK | | |

<RE-SEARCH RESULT DISPLAY>

| FIRST PAGE | 1 | 2 | 3 | 4 | 5 | ... | 38 | 39 | ... |
|---|---|---|---|---|---|---|---|---|---|
| SHIRT | DIAGONAL STRIPES | | DIAGONAL STRIPES | | | | DIAGONAL STRIPES | | |
| BAG | BLACK | | BLACK | | | | BLACK | | |
| AROUND NECK | BLACK | | BLACK | | | | BLACK | | |

...

| SECOND PAGE | 51 | 52 | 53 | 54 | 55 | 56 | 57 | 58 | ... |
|---|---|---|---|---|---|---|---|---|---|
| SHIRT | | | | DIAGONAL STRIPES | | | | | |
| BAG | | | | BLACK | | | | | |
| AROUND NECK | | | | BLACK | | | | | |

IMAGE SEARCHING APPARATUS, IMAGE SEARCHING METHOD, AND STORAGE MEDIUM

BACKGROUND OF THE INVENTION

Field of the Invention

The present invention relates to an image searching apparatus, an image searching method, and a storage medium.

Description of the Related Art

In recent years, practical uses for systems for searching within a video of a monitoring camera using a person image as a query for a scene in which a specific person appears have been developing. When performing a search using a person image, a method in which a feature amount comprising of a multi-dimensional vector is extracted from the image and then a search is performed based on similarity to the feature amount is common.

Also, in a case where a user was not satisfied with the search result of such a search method, a technique called a relevance feedback has come to be developed in which, by having the user manually provide a correct or incorrect label to the search result, the search result is updated using that label. A classic relevance feedback example is based on a scheme disclosed in Rocchio (J. Rocchio "Relevance feedback in information retrieval", 1965) and performs a re-search by adjusting a query feature amount.

SUMMARY OF THE INVENTION

According to one embodiment of the present invention, an image searching apparatus comprises a searching unit configured to search a plurality of search target images for an image relating to a query image based on a first similarity to the query image by a first evaluation scheme; a first obtaining unit configured to obtain a feedback indicating at least one of correct or incorrect regarding the image searched by the searching unit; a second obtaining unit configured to obtain an evaluation of an effect on a search result of the image of changing a similarity evaluation scheme to a second evaluation scheme from the first evaluation scheme in accordance with the feedback; and a control unit configured to control, in accordance with the evaluation of the effect, a search of the plurality of search target images for the image relating to the query image based on a second similarity to the query image by the second evaluation scheme.

According to another embodiment of the present invention, an image searching method comprises: searching a plurality of search target images for an image relating to a query image based on a first similarity to the query image by a first evaluation scheme; obtaining a feedback indicating at least one of correct or incorrect regarding the searched image; obtaining an evaluation of an effect on a search result of the image of changing a similarity evaluation scheme to a second evaluation scheme from the first evaluation scheme in accordance with the feedback; and controlling, in accordance with the evaluation of the effect, a search of the plurality of search target images for the image relating to the query image based on a second similarity to the query image by the second evaluation scheme.

According to another embodiment of the present invention, a non-transitory computer-readable storage medium stores a program which, when executed by a computer comprising a processor and a memory, causes the computer to: search a plurality of search target images for an image relating to a query image based on a first similarity to the query image by a first evaluation scheme; obtain a feedback indicating at least one of correct or incorrect regarding the searched image; obtain an evaluation of an effect on a search result of the image of changing a similarity evaluation scheme to a second evaluation scheme from the first evaluation scheme in accordance with the feedback; and control, in accordance with the evaluation of the effect, a search of the plurality of search target images for the image relating to the query image based on a second similarity to the query image by the second evaluation scheme.

Further features of the present invention will become apparent from the following description of exemplary embodiments (with reference to the attached drawings).

BRIEF DESCRIPTION OF THE DRAWINGS

FIGS. 2A and 2B are views for illustrating an example of search processing of the image searching apparatus according to an embodiment.

FIGS. 3A to 3D are views for illustrating an example of feedback processing of the image searching apparatus according to an embodiment.

FIGS. 4A to 4C are views for illustrating an example of re-search processing of the image searching apparatus according to an embodiment.

DESCRIPTION OF THE EMBODIMENTS

Figure 1A:
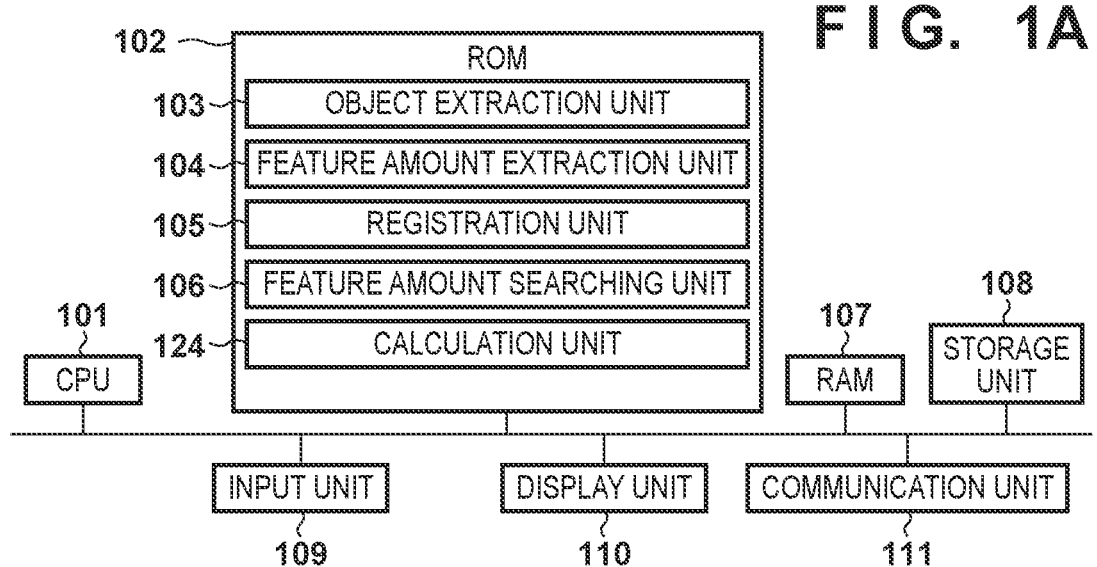
FIGS. 1A and 1B are views for illustrating an example of a functional configuration and a hardware configuration according to an embodiment.

A waiting time when conducting a search is likely to be longer in a case where a search population is large, and a longer time is required for the search. For example, there are cases where it can take on the order of minutes to perform a search that targets several days' worth of a video of a plurality of monitoring cameras. In addition, in a case where a search result is refined by repeating feedback and re-search a number of times, processing involving many minutes of waiting is executed a number of times thereby resulting in a cumbersome operation for the user.

An embodiment of the present invention is able to reduce the number of times that re-searching is conducted in an image search.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

An image searching apparatus according to the present embodiment obtains from search target images which are a search population, a search result that is related to a query image based on a similarity to the query image. Next, user feedback in relation to the search result is obtained, and the effectiveness of the feedback is evaluated. That is, the image searching apparatus changes the scheme for evaluating the similarity according to the feedback, and then evaluates an effect that the change has on the search results of the image. Furthermore, in accordance with the result of such an evaluation of the effect, the apparatus controls whether to perform a re-search of the search population based on similarity in accordance with the changed evaluation scheme. The user feedback is information regarding an image and provided by the user which includes a label on whether the image is correct or incorrect in relation to the query image. In the present embodiment, the user feedback is provided regarding an image that is included in the search results obtained from a group of search target images.

Also, the image searching apparatus according to the present embodiment is able to perform a re-search (a re-ranking) based on a similarity that was newly calculated in relation to only high rank search results (that is, those of a high similarity) in order to evaluate effect in accordance with the above-described feedback and then present those results. Below, assume that such a re-search that is conducted in relation to only high rank search result is called a "re-ranking" and a re-search in relation to the search population is simply called a "re-search". Also, the image searching apparatus according to the present embodiment, regarding the above-described high rank search results, may store data in a storage with a relatively fast reading speed such as a RAM in order to use it for re-ranking. According to such a configuration, because a "re-ranking" is performed targeting only high rank search results which are a fewer in number, a high-speed re-search (re-ranking) becomes possible and the effect of the feedback can be quickly confirmed.

In the present embodiment, the user evaluates the effectiveness of the feedback based on a re-ranking result. That is, by the user, when he/she determines based on the re-ranking result that the effectiveness of the feedback in relation to a search could be confirmed, instructing a re-search in relation to the search population, it becomes possible to reduce the number of times that re-searching, which is likely to require a large processing time, is conducted. Thus, by confirming the effectiveness of feedback based on a result of rapid processing which performs re-ranking only on the high rank search results, it becomes possible to improve the convenience of a search by user feedback.

Below, assume that the effectiveness of the feedback is information that indicates a possibility that a re-search will not be useless and to be effective indicates that such a possibility is high. That is, how many images, as feedback, to designate as correct or incorrect data in order to obtain an expected search result depends on the query image and the search population. For example, if it is possible to distinguish a specific person from another person by designating a color around the neck, then it becomes possible to perform an effective re-search by designating as incorrect an image that is different from the query image in the color around the neck. Meanwhile, there are cases where it may be necessary to designate the color around the neck, a color of a bag, and a color of a shirt in order to distinguish a specific person from another person. In such a case, even if an image that is different from the query image in the color around the neck and the color of the bag is designated as incorrect, because an image that is different in the color of the shirt cannot be removed from the search results, such feedback may be referred to as ineffective feedback. Also, assume that a useless re-search is a re-search that increases the total number of times that re-searching is conducted. That is, for example, a re-search, from which a result that is desirable for the user was not obtained irrespective of having performed a re-search which tends to require a long time, will introduces the necessity for the feedback to be performed again. Furthermore, assume that, in a case where a similarity is simply recited, the similarity is a similarity to a feature amount that is set as a query image in that example.

The image searching apparatus according to the present embodiment is a server for analyzing a video transmitted from an image capturing device and then presenting search results to the user. FIG. 1A is a block diagram for illustrating an example of a hardware configuration of the image searching apparatus according to the present embodiment. A CPU 101 performs control of the entire image searching apparatus according to the present embodiment by executing a control program stored in a ROM 102. The control program stored in the ROM 102 includes an object extraction unit 103, a feature amount extraction unit 104, a registration unit 105, a feature amount searching unit 106, and a calculation unit 124. Each functional unit that the ROM 102 includes will be described later. A RAM 107 temporarily stores each type of data from each configuration element of the image searching apparatus according to the present embodiment. Also, by deploying a program in the RAM 107, the CPU 101 is enabled to execute the program. Also, each configuration that is included in an image searching apparatus 120 illustrated in FIG. 1B such as a normal searching unit 117, a feedback searching unit 119, and a re-ranking unit 123, which are described later, are achieved similarly by the CPU 101 executing a program on a memory.

A storage unit 108 stores data which is a processing target (that is, a search target) of the image searching apparatus according to the present embodiment. An HDD, a flash memory, various types of optical media, and the like may be used as a medium for the storage unit 108. An input unit 109 is configured, for example, by a keyboard, a touch panel, and the like and obtains an input from the user into the image searching apparatus. Although processing details will be described later in FIG. 5, the user, by using the input unit 109, is able to input into an information processing apparatus a search condition, a query image feedback information (designating as correct or incorrect) in relation to a search result, and the like, for example. A display unit 110 is configured by a liquid crystal display and the like, for example, and displays in relation to the user a result of processing in the image searching apparatus. In the present embodiment, the display unit 110 is able to display a search result, a re-ranking result, a re-search result, and the like. Also, the image searching apparatus according to the present embodiment is able to communicate with another apparatus such as an image capturing apparatus via a communication unit 111.

Figure 1B:
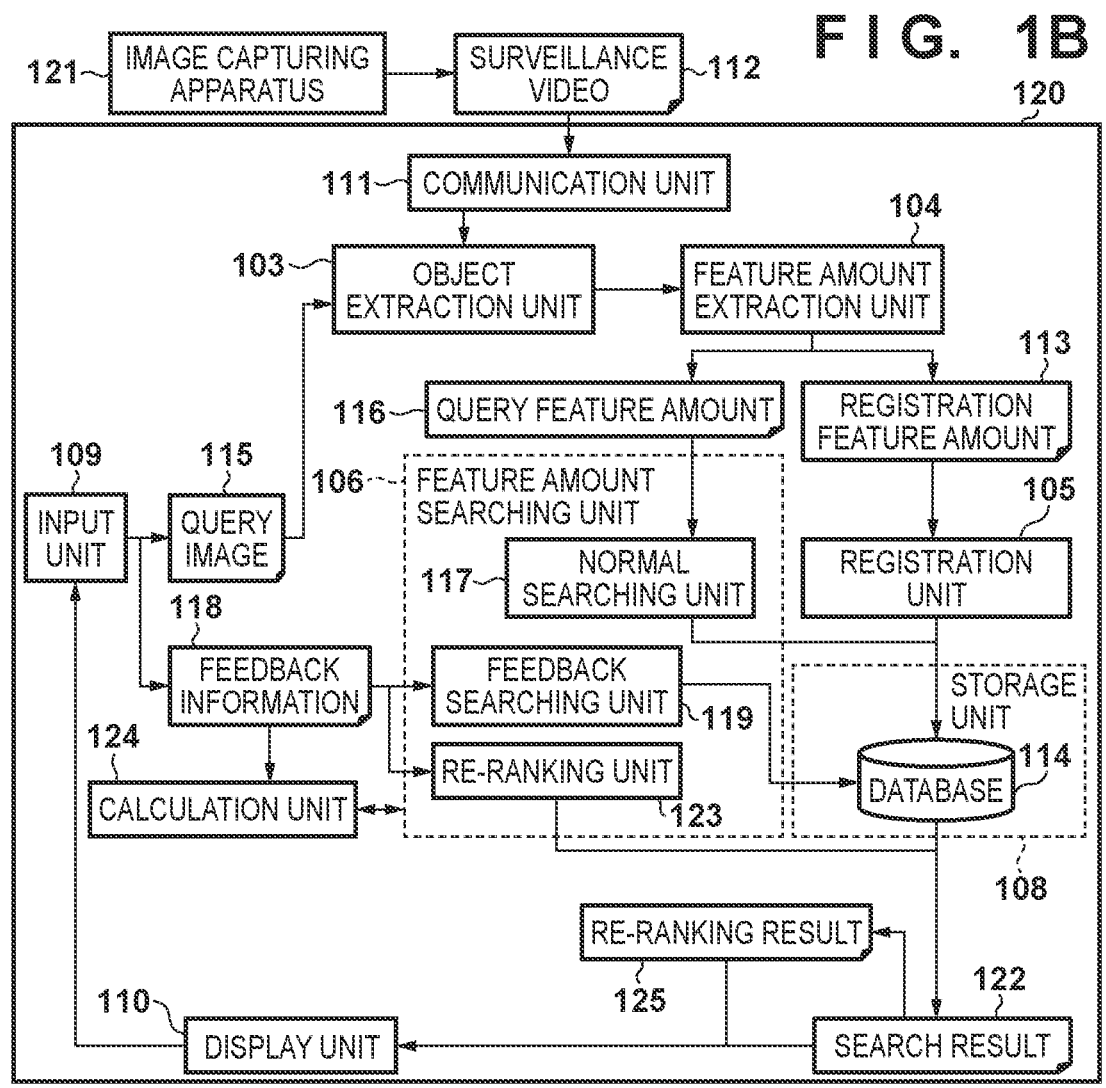

FIG. 1B is a block diagram illustrating an example of a dataflow of information processing performed by the image searching apparatus according to the present embodiment. In the example in FIG. 1B, the image searching apparatus according to the present embodiment is a portion illustrated as the image searching apparatus 120 and obtains a surveillance video 112 that is obtained by an external image capturing apparatus 121 via the communication unit 111. Although it is assumed that the surveillance video 112 here is configured by images captured in sequence, no limitation is made in particular.

In the data registration processing performed by the image searching apparatus 120, the object extraction unit 103 analyzes the obtained surveillance video 112 and extracts an object that appears in the video. Although it is assumed that the object that is extracted by the object extraction unit 103 is a person region for the sake of descriptive convenience in the present embodiment, no limitation is made in particular. For example, the object extraction unit 103 may extract a face region as an object. Next, the feature amount extraction unit 104 extracts a registration feature amount 113, which is a feature amount of an object, from the object that was extracted by the object extraction unit 103. The registration unit 105 registers into a database 114 the registration feature amount 113 that was extracted by the feature amount extraction unit 104. The database 114 stores information which is a search population. In the database 114, a thumbnail image of a cut-out object region, capturing time information, capturing camera information, and the like regarding an image that configures the surveillance video 112 may be registered. According to such a configuration, the information registered in the database 114 and the registration feature amount 113 can be used in association when a search is performed by the user. In the example in FIG. 1B, the database 114 is positioned in the storage unit 108.

In search processing according to the present embodiment, the image searching apparatus 120 first obtains a query image 115 from the user via the input unit 109. Next, the object extraction unit 103 extracts an object that appears in the query image 115 similarly to the data registration processing performed by the image searching apparatus 120. Furthermore, the feature amount extraction unit 104 extracts a query feature amount 116 which is the feature amount of the object extracted from within the query image 115.

The normal searching unit 117 performs a normal search (that is, an initial search). The normal searching unit 117 searches the registration feature amount 113 registered in the database 114 for a feature amount that is similar to the query feature amount 116 in accordance with a similarity calculated based on the feature amount. Also, the normal searching unit 117 obtains a search result 122, which is a list of objects selected from search target images in accordance with the similarity, as a list of objects (re-ranking targets) on which to perform re-ranking. In this example, the normal searching unit 117 obtains as the search result 122 a list of objects, corresponding to the feature amount, of a predetermined number in order of highest similarity. The normal searching unit 117, when performing a normal search, calculates the similarity using a preset similarity calculation scheme via the calculation unit 124, and details thereof will be described later. Also, no limitation is made in particular to the predetermined number, which is set as a number of objects in a search result here, and a desired value may be set as appropriate. Also, the normal searching unit 117 saves in the RAM 107 the search result 122 together with the feature amount of the corresponding object. Next, the normal searching unit 117 outputs to the display unit 110 a thumbnail image of the object of the search result 122. For example, the normal searching unit 117, in a case where there is a large number of objects in the search result 122, may present a predetermined number of thumbnail images on one screen so that subsequent results can be confirmed by a scroll operation. Here, the number of thumbnail images to be displayed on one screen is not particularly limited, and for example, 50 images may be displayed.

The display unit 110 presents to the user the search result 122 of the normal searching unit 117. The user, via the input unit 109, is able to designate a correct image in which an object that coincides with the object in the query image 115 appears or an incorrect image from among the thumbnail images of the search result 122 displayed on the display unit 110. The re-ranking unit 123 obtains as feedback information 118 label information indicating the result of designating correct or incorrect by the user regarding the image. Also, the feedback searching unit 119 may obtain the feedback information 118 and perform the search processing again. Below, for simplicity, assume that correct or incorrect refers to whether an image that is selected by the user on the display unit 110 is correct or incorrect as described above.

The feedback information 118 includes label information designated by the user regarding an image and that is for indicating that the image is either a correct or incorrect image and includes a feature amount of the object corresponding to that image. The calculation unit 124 changes the similarity evaluation scheme in accordance with the feedback. The calculation unit 124 according to the present embodiment generates a similarity calculation scheme between a query image and search target images based on a feature amount and commonality of the query feature amount 116 and correct or incorrect data. By the re-ranking unit 123 performing a re-ranking using the generated similarity calculation scheme and by the user confirming the effectiveness of a feedback from a re-ranking result, it becomes possible to achieve improvement in search accuracy. The method of generating the similarity calculation scheme will be described in detail in steps S506 to S509.

The re-ranking unit 123, by targeting the feature amount of the object in the search result 122 and calculating a similarity using the similarity calculation scheme generated in the calculation unit 124, obtains a re-ranking result 125 in an array in accordance with the similarity. The obtained re-ranking result 125 is displayed on the display unit 110. For example, the re-ranking unit 123, in a case where the search result 122 is set to 1000 objects even in a case where there are millions of search target images, is able to calculate the similarity of 1000 objects, which is the same number as the search result 122 as well as re-rank and present in the order of highest similarity. In such a case, although the re-ranking unit 123 will not newly detect a correct image that was not included in the 1000 objects of the search result, because the number of processing targets included in the search result is smaller, it becomes possible to promptly reflect the results on the display unit 110. Thus, it becomes possible for the user to immediately confirm the effect of the feedback in which only the search result 122 was set as a population.

In the present embodiment, it is determined whether the effectiveness of the feedback could be confirmed by the user evaluating the re-ranking result 125. The re-ranking result 125 is presented on the display unit 110, and the user is able to immediately confirm the result of the re-ranking reflected on the display unit 110. Next, in a case where the user determines by evaluating the re-ranking result that the accuracy of the search result can be improved by the feedback that he/she has provided, he/she is able to issue an instruction for a feedback search (a re-search).

The feedback searching unit 119 calculates a similarity targeting the feature amount that is included in the database 114 using the similarity calculation scheme that was generated by the calculation unit 124. By such processing, it may be possible to detect a correct image that was missed by the 1000 objects of the search result 122. The re-ranking result 125 and the search result 122 by the re-ranking unit 123 and the feedback searching unit 119 may be outputted to the display unit 110 similarly to when searching normally. Although no limitation is made in particular to the form of the presentation or to the number of thumbnail images presented on the display unit 110 as the re-ranking result, it is assumed that a similar presentation will be performed as the presentation of thumbnail images in a normal search result for the sake of descriptive convenience of this example.

Note that the input unit 109 and the display unit 110 may be apparatuses that are comprised in another apparatus and may perform a transmission/reception of a query feature amount and a search result via the communication unit 111. Also, the control program is not limited to what is stored in the ROM 102 and some of it may be configured to be comprised in a separate apparatus. For example, the object extraction unit 103 and the feature amount extraction unit 104 may be comprised in another server and the image searching apparatus 120 may be configured so as to comprise only the registration unit 105 and the feature amount searching unit 106. In a case where such a configuration is taken, it becomes possible to separate apparatuses between processing for analyzing a video and processing related to a search, and thus, it becomes possible to select a hardware specification appropriate for the respective processing.

No limitation is made in particular to a method for the object extraction unit 103 to detect a human body region. Below, it is assumed that the object extraction unit 103 uses a scheme in which, by learning a feature of the person region in advance and then scanning within an input image using search windows, it determines whether or not each search window is a human body region. As a learning method for such, a deep learning method such as ensemble learning or a CNN (Convolutional Neural Network) may be used. Also, no limitation is made in particular to the method by which the feature amount extraction unit 104 detects a feature amount of an object. For example, the feature amount extraction unit 104 may detect as a feature amount a color histogram of a partial region within a person region or may use a method for extracting by a deep learning method such as a CNN.

Processing corresponding to each step of the flowchart described in the present embodiment may be achieved by software using a CPU or by hardware such as an electronic circuit.

FIGS. 2 to 4 are for illustrating an overview of search accuracy improvement based on a search operation and a feedback according to the present embodiment. In this example, the user designates an image, on which there is a portion obviously different from the person whom he/she wants to search for, as an incorrect image from among thumbnail images displayed on the display unit 110. Also, the user is able to instruct a re-ranking after selecting an incorrect image. Next, the image searching apparatus 120 executes a re-ranking and presents the re-ranking result 125. Furthermore, the user, in a case where he/she determines from the re-ranking result that a result has a sufficient search accuracy improvement effect, may instruct a re-search. As a result, it becomes possible for the image searching apparatus 120 to obtain a search result including an image that was omitted in the initial search. According to such processing (according to three re-rankings and one re-search in this example), it becomes possible to obtain a search result by sufficient-effect feedback. Thus, it becomes easy to obtain a result at a high speed comparing to a case where a re-search is performed every time without performing a re-ranking.

Detailed steps of examples illustrated in FIGS. 2 to 4 are described below. FIG. 2A is a view representing portions that have a feature of an image (a query image 201) of a person for whom the user wants to search. The image searching apparatus 120, when the query image 201 is inputted, searches for an image of clothing similar to the query image 201 from within a database and as illustrated in FIG. 2B, is able to obtain and present a search result list 202 of 1000 objects with the highest ranked similarities, for example. Because the image searching apparatus 120 is not able to display 1000 objects in one screen, it is possible to separate and display 50 objects per page. That is, the image searching apparatus 120 is able to display the search results so that the top 1 to 50 results with the highest ranking similarities are on a first search result page, the top 51 to 100 results are on a second search result page, and the top 101 to 150 results are on a third search result page. The image searching apparatus 120 may display a first search result page 203 immediately after a search, and then display in accordance with an instruction from the user, a next page, a previous page, or a designated page. Also, the image searching apparatus 120 may achieve a similar function with a screen scroll instead of page segmentation as illustrated in FIG. 2.

In this example, a search result 205 has the highest similarity to the query image 201 and is displayed at the beginning of a search result. However, since the search result 205 is similar to the query image 201 in the color patterns of a shirt and around the neck but does not have a bag, a person that is captured is different from a person that is captured in the query image 201. Also, on the first search result page 203, there is a search result 206 which is different from the query image 201 in the color pattern around the neck. Furthermore, on the third search result page 214, there is a search result 207 which is different from the query image 201 in the color pattern of the shirt. There are cases where although an image is of the same person as that of the query image 201, because of a reason such as a capturing condition (a capturing direction, an illumination condition, and the like) being different, an image that is displayed in a low level of the first page such as a search result 208 may be recorded within the database 114. Also, there are cases where an image that is to be displayed on a later page as a search result 209 or an image that did not enter the search result list 202, which is for 1000 highest ranked objects, and is included in an unranked 211 list such as a reference numeral 210 may be recorded within the database 114. Although originally, the unranked list is a list that cannot be known by the user, the unranked list will be clearly described as unranked 211 below for the sake of descriptive convenience.

The user, inputs as feedback content 312 that the search result 205 is incorrect, as illustrated in FIG. 3A. The image searching apparatus 120 executes a re-ranking immediately based on that feedback and is able to reflect the result of the re-ranking on the search screen. In a case where the query image 201 and the search result 205 are compared, because the bag is different between the two, the image searching apparatus 120 generates a similarity calculation scheme in which the weight of the feature indicating the bag is made to be larger and then performs a re-ranking using the generated similarity calculation scheme. As a result, the image searching apparatus 120 removes results that are different from the query image 201 for the bag from the highly ranked search results as illustrated in a search result list 313 of FIG. 3B.

However, the search result 206 which is different from the query image 201 in the color pattern around neck remains in the high ranking displayed in the search result list 313. Thus, the user, as illustrated in FIG. 3C, next inputs as feedback content 314 that the search result 206 within the search result list 313 is incorrect. The image searching apparatus 120 executes a re-ranking immediately based on that feedback (that is, generates a similarity calculation scheme in which the weight of the feature indicating the color pattern around the neck is made to be larger and then uses the generated similarity calculation scheme) and is able to reflect the result of the re-ranking on the search screen. As a result, the image searching apparatus 120 removes results that are different from the query image 201 for the color pattern around the neck from the highly ranked search results as illustrated in a search result list 315 of FIG. 3D.

However, this time, the search result 207 which is different in the color pattern of the shirt is displayed on the first page of the search result. Thus, the user, as illustrated in FIG. 4A, inputs as feedback content 416 that the search result 207 displayed in the search result list 315 is incorrect. The image searching apparatus 120 executes a re-ranking immediately based on that feedback and is able to reflect the result of the re-ranking on the search screen. As a result, the image searching apparatus 120 removes results that are different from the query image 201 for the color pattern of the shirt from the highly ranked search results as illustrated in a search result list 417 of FIG. 4B. Even though these operations are executed, because an image 210 of the unranked 211 is not a re-ranking target, it is not displayed as a search result.

The user is able to confirm the effect of the feedback content based on the re-ranking results up to this point and issue an instruction for a re-search. The image searching apparatus 120, in a case where an instruction for a re-search was obtained, uses the similarity calculation scheme that was used in the last re-ranking, calculates a similarity between the feature amount of the query image 201 and the feature amount of images within the database 114, and then displays a re-search result based on the calculated similarity. As a result, because a search is performed with the image 210 in the unranked 211 as a search target, the image 210 is detected as a search result as illustrated in a search result list 418 in FIG. 4C. According to such a configuration, the image searching apparatus 120 is able to perform a re-ranking in real-time every time the user inputs a feedback and then display a re-ranking result. Also, the user, when he/she determines that the effectiveness of the feedback could be confirmed, is able to issue an instruction to execute a re-search.

Figure 6:
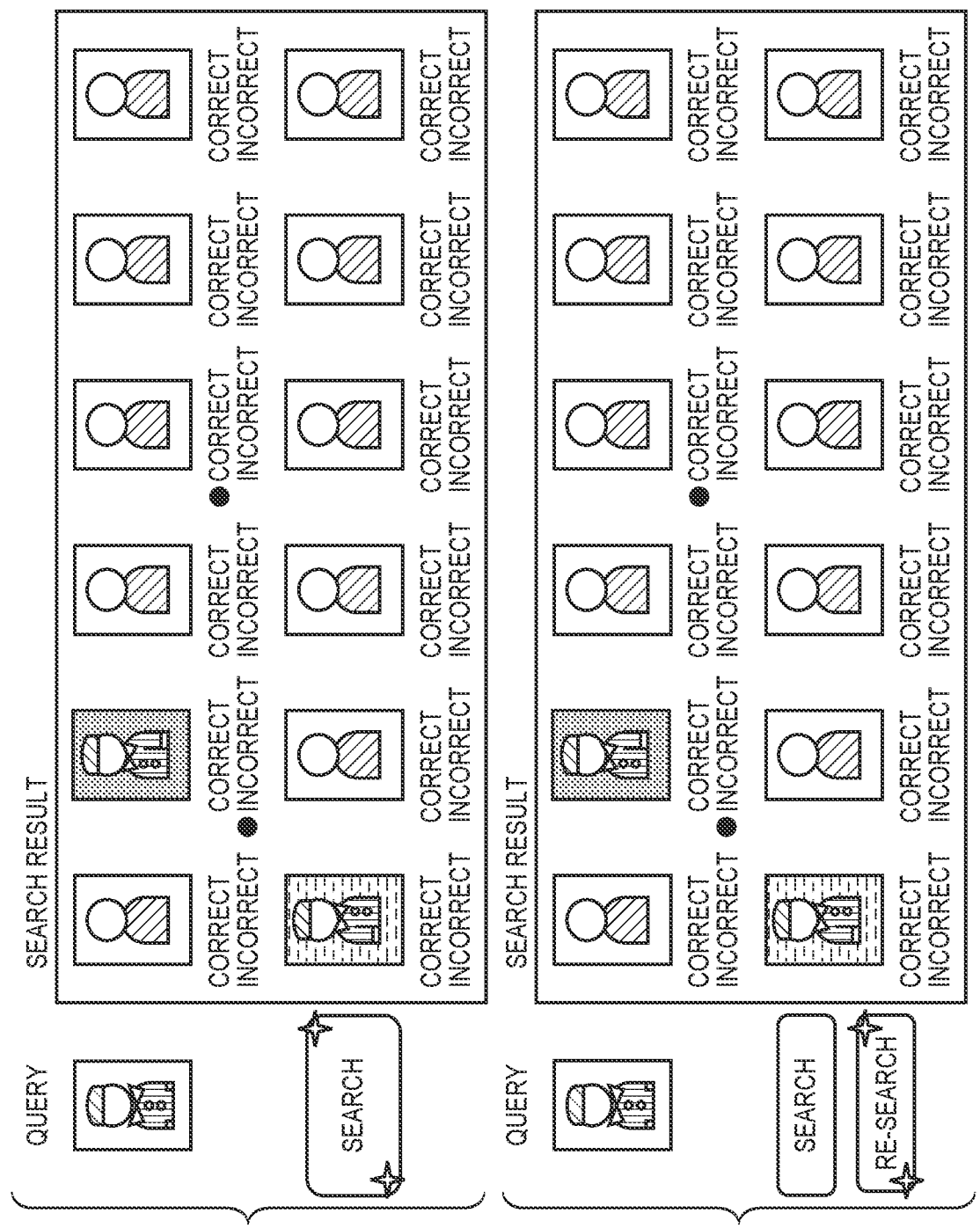
FIGS. 6A and 6B are views for describing a re-search button of the image searching apparatus according to an embodiment.

Also, in the present embodiment, the user presses a re-search button after confirming the effect of the feedback content by confirming the re-ranking result. However, it is not necessary for a new re-search button to be prepared. For example, as illustrated in FIG. 6A, a button for issuing an instruction for the normal searching unit 117 to perform a search and a button for a re-search may be the same button. In case of such a configuration, a re-search is conducted when the search button is pressed in a state where a feedback is provided. Also, as illustrated in FIG. 6B, it is possible to arrange both a search button and a re-search button. The re-search button may be configured so that a useless re-search is unlikely to be conducted by being set to become active only after a feedback is provided.

Note that although an example where the user designates an incorrect image was indicated in FIG. 2, a configuration may be such that correct instead of incorrect may be designated in a case where a correct image is included in a search result. It is considered that in a case where the user designates correct, the feature of an object that is captured in the query image is well apparent in the feature amount among correct images or in a common portion of the feature amounts of the query image and a correct image. Accordingly, the image searching apparatus 120, similarly to the examples in FIGS. 2 to 4, is able to generate a similarity calculation scheme in which the weight of the dimension of the above-described common portion is made to be larger and to perform a re-ranking with the generated similarity calculation scheme. Next, the image searching apparatus 120, in a case where an instruction for a re-search is provided, is able to obtain the effect of re-search accuracy improvement based on a feedback by performing a re-search with the last generated similarity calculation scheme. Also, in a case where both correct and incorrect have been designated, a combined weight can be obtained by combining both weight calculation methods.

Figure 7:
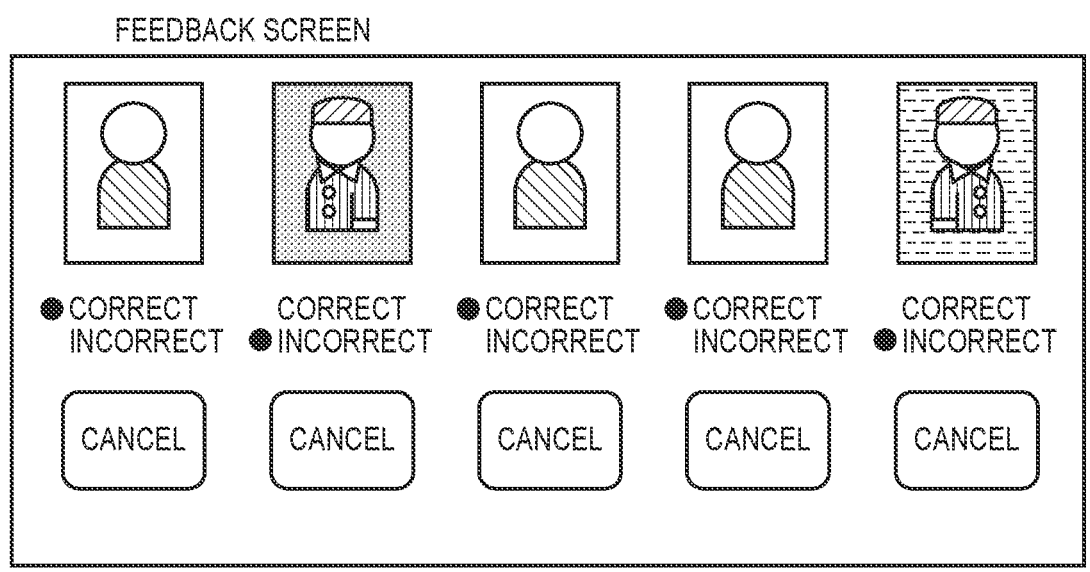
FIG. 7 is a view for illustrating an example of feedback screen of the image searching apparatus according to an embodiment.

Note that regarding the feedback, a configuration may be taken so as to be able to not only additionally designate a correct or incorrect image but also cancel a correct or incorrect image designated previously. In such a case, the image searching apparatus 120 may perform a re-ranking and a re-search based on a correct or incorrect image whose designation was not cancelled and the query image. In such a case, the image searching apparatus 120, by arranging a user feedback screen as illustrated in FIG. 7, may be configured so that the user is able to execute a confirmation and a re-setting of correct and incorrect.

Also, no limitation is made in particular to a method for setting feedback content. The input unit 109 may display a list for selecting correct or incorrect in a case where the user clicks on an image, for example, or perform a selection of correct with a left click of a mouse and a selection of incorrect with a right click. In the present embodiment, although a re-ranking is immediately executed in a case where a selection of correct or incorrect has been made and then the result is reflected onto a screen, no limitation is made in particular to this. For example, the re-ranking unit 123 may perform a re-ranking in accordance with an instruction from the user to perform a re-ranking. That is, the re-ranking unit 123 may prepare a re-ranking button, and the user may input an instruction to perform a re-ranking by pressing the re-ranking button after selecting at least one correct or incorrect image. Next, the re-ranking unit 123 may perform a re-ranking upon re-ranking reception (a search instruction reception).

Figure 5:
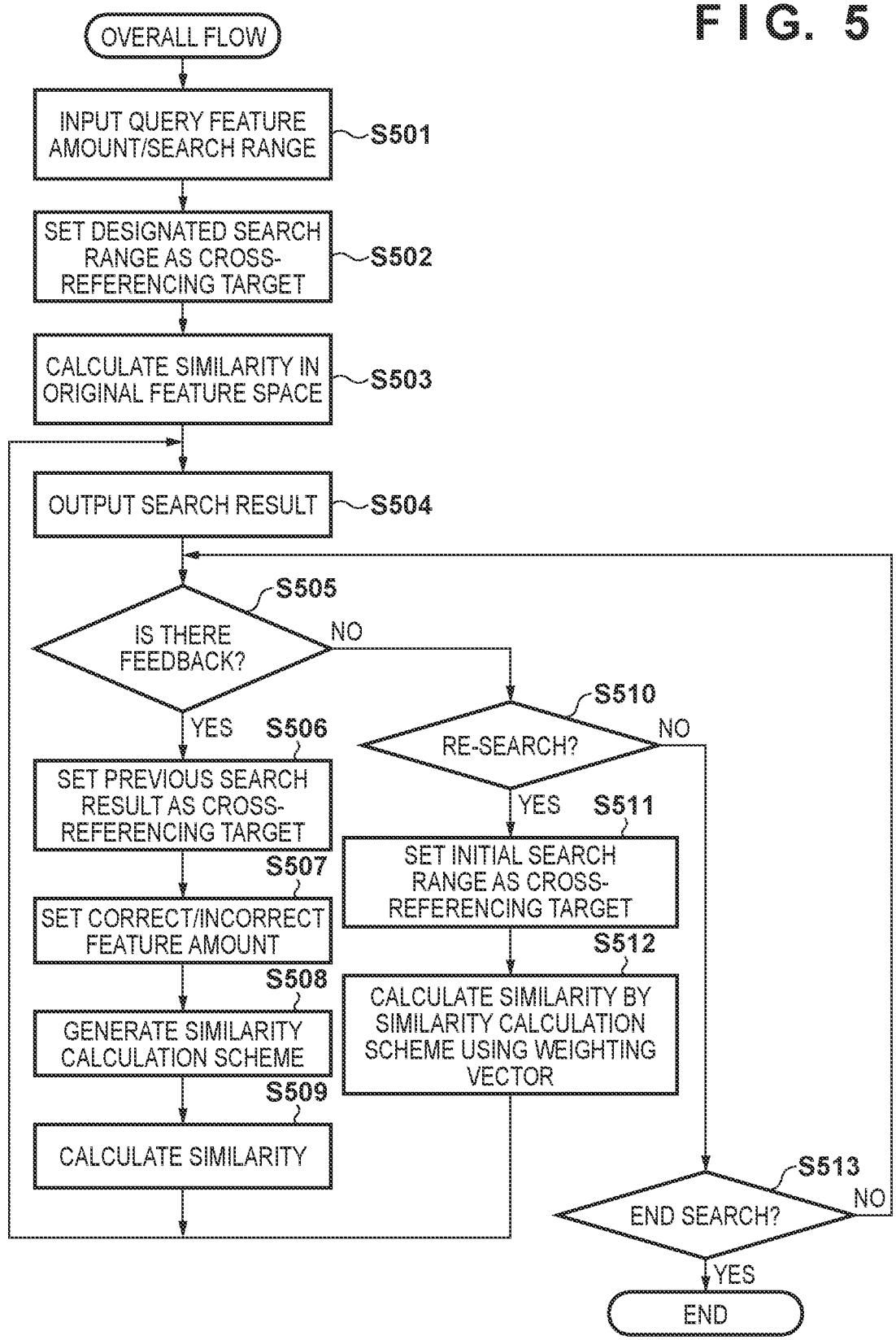
FIG. 5 is a flowchart for an example of processing in an image searching method according to an embodiment.

Below, search-related processing among the above-described processing performed by the image searching apparatus 120 will be described in accordance with a flowchart. FIG. 5 is a flowchart illustrating an example of feature amount search processing performed by the image searching apparatus 120 according to the present embodiment. First, in step S501, the normal searching unit 117 obtains a query feature amount extracted from a query image inputted by the user. Also, the normal searching unit 117 is able to obtain a user input for designating a search range such as a camera or a capturing time of a search target image in relation to the database 114. A search range inputted into the normal searching unit 117 may be all of the images within the database 114, and in a case where the user wants to search for a person captured at a specific time or a person captured by a specific camera, may be images for which a cross-referencing target was narrowed down by a capturing time or a camera name. In step S502, the normal searching unit 117 sets as a cross-referencing target the feature amount of an image in the designated search range. Next, in step S503, the normal searching unit 117 via the calculation unit 124 calculates a similarity between the feature amount of the query image and the feature amount of the cross-referencing target. No limitation is made in particular to the calculation method of the similarity of feature amounts, and by using a reciprocal of one of the various types of distance functions, for example, it may be calculated so that the similarity increases the closer the distance is between the feature amounts. In the present embodiment, it is assumed that the calculation unit 124 uses a Euclidean distance for calculating distance.

At this time, the normal searching unit 117 selects from cross-referencing target feature amounts a feature amount whose similarity is higher than a predetermined threshold set in advance or a feature amount whose similarity is high based on a reference such as feature amounts of a predetermined number (for example, 1000 objects) from the highest similarity. Next, the normal searching unit 117 saves on the RAM 107 the selected feature amount and an image that corresponds to that feature amount. Here, no limitation is made in particular to a threshold or a value of the predetermined number that is used by the normal searching unit 117, and a desired value may be set as appropriate to each.

In step S504, the normal searching unit 117 obtains from the feature amount with a high similarity selected in step S503 the predetermined number (for example, 50 objects) with the highest ranking similarities and then outputs to the display unit 110 a thumbnail image that corresponds to the selected feature amount. Here, the predetermined number that is obtained by the normal searching unit 117 may be set in advance in accordance with the size of the display screen and the like and may be designated dynamically as a number that the user wishes to view. Although form in which sorting and displaying in a descending order of similarity is a common form of displaying thumbnail images of search results, no limitation is made in particular to this. As search results, the normal searching unit 117 may display on the display unit 110 images sorted by capturing time, for example. In the below, assume that a search result is obtained and displayed in a descending order of highest ranking similarity for the sake of descriptive convenience.

In step S505, the normal searching unit 117 confirms whether there is feedback from the user, that is, whether the user performed a designation of a correct or incorrect image in relation to the search results. In a case where there is feedback, the processing advances to step S506 and re-ranking processing series up to step S509 is performed. In a case where there is no feedback, the processing advances to step S510 and it is confirmed whether there is an instruction for a re-search from the user. In a case where there is an instruction for a re-search, the processing advances to the re-search processing from steps S511 to S512. In a case where there is no instruction for a re-search, the processing advances to step S513 and it is confirmed whether to end the search. In a case where the search is not ended, the processing returns to step S505 and the image searching apparatus 120 performs each of the processes again. In a case where the search is ended, the normal searching unit 117 ends the present flow.

Next, the re-ranking processing from steps S506 to S509 will be described. In the re-ranking processing according to the present embodiment, a similarity calculation scheme is generated based on label information and the feature amount that corresponds to the image designated by the user. In step S506, the re-ranking unit 123 sets as a cross-referencing target the feature amount of the image selected in step S503. In step S507, the re-ranking unit 123 obtains sets of the feature amount corresponding to a search result designated as a correct or incorrect image by the user in step S505 and label information for distinguishing that the search result is either a correct or incorrect image. That is, feedback information regarding the image designated by the user is obtained. Next, the re-ranking unit 123 sets the feature amount of the image obtained in step S507 as a feature amount to be used for generating a similarity calculation scheme in accordance with the label information of the image. Note that in a case where the present processing is being executed for the second or more time, the feedback information for the result designated by the user in step S505 of that round is added to the feedback information from up to the previous round.

In step S508, the calculation unit 124 calculates a weighting vector w=(w1, w2, . . . , wd) as a parameter group for generating a similarity calculation scheme based on the feedback information obtained in step S507. Here, d is a number of dimensions of a feature space that is used. Also, the weighting vector w includes a weighting coefficient for conversion of each dimension of a feature amount, as respective elements. It is possible to calculate a similarity with a changed similarity calculation scheme by using as a feature amount the result of multiplying each dimension of a feature amount by each element of this weighting vector.

First, a description of a weight calculation in a case where an incorrect feature amount was designated by feedback from the user will be given. In a case where an a units of an incorrect feature amount n were designated by the user, when the query feature amount is q, the weight of an i-th dimension $w^i$ is calculated by Equation (1) and Equation (2) below, for example.

$$\text{w\_local}^i = \sum_{k=1}^{a} |q^i - n_k^i| \quad (1)$$

$$w^i = \frac{\text{w\_local}^i}{\sum_{i=1}^{d} \text{w\_local}^i} \times d \quad (2)$$

The calculation unit 124, in Equation (1), calculates a weight value $\text{w\_local}^i$ for each dimension by taking a sum of a difference between a query feature amount and each incorrect feature amount for each dimension. According to the present equation, the larger the difference is between the numerical values of the query feature amount and the incorrect feature amount of the dimension, the larger the calculated weight value. Because it is considered that a dimension for which the difference between the numerical values of the query feature amount and the incorrect feature amount is large indicates a feature for discriminating what is incorrect for a query, an effect of emphasizing the difference from what is incorrect can be obtained by enlarging the weight of such a dimension. Conversely, the smaller the difference is between the numerical values of the query feature amount and the incorrect feature amount of the dimension, the smaller the calculated weight value. Because it is considered that a dimension for which the difference between the numerical values of the query feature amount and the incorrect feature amount is small is unlikely to contribute to discriminating difference between a query and incorrect, an effect on a search result is made smaller by reducing the weight of such a dimension.

The calculation unit 124, in Equation (2), performs a normalization for obtaining a final weight value $w^i$. The calculation unit 124, in this equation, performs a normalization so that a sum of weights of each dimension is a number of dimensions d. According to such processing, it is possible to make a difference in value that an absolute value of the distance before/after the change in the similarity calculation scheme can take smaller.

Because a weighting is decided based on a relative value between the dimensions of the difference between the query feature amount and the incorrect feature amount in Equation (1) and Equation (2), in a case where there is even a slight difference in some of the dimensions, the weighting of those dimensions may be large. In order to avoid this problem, the weighting calculated by Equation (1) may be set to zero in a case where the difference between the numerical values of the query feature amount and the incorrect feature amount is less than or equal to a predetermined value, for example.

Next, a description of a weight calculation in a case where an incorrect feature amount was designated by feedback from the user will be given. In a case where an a units of a correct feature amount q were designated by feedback from the user, when the query feature amount is q, the weight of an i-th dimension wi is calculated by Equation (3) below and Equation (2) described above, for example.

$$\text{w\_local}^i = \frac{1}{\sum_{k=1}^{b}(p_k^i - \overline{p^i})^2} \tag{3}$$

The calculation unit 124, in Equation (3), calculates a weight of each dimension by taking a reciprocal of a sum of squared deviation of a set of correct feature amounts for each dimension. According to the present equation, the smaller the distribution is between the numerical values of the correct feature amounts of the dimension, the larger the calculated weight value. Because it is considered that a dimension whose variance in numerical values of a correct feature amount is small indicates a correct feature well, it tends to increase similarity based on the correct feature amount by enlarging the weight of such a dimension. Conversely, the larger the variance is in a numerical value among correct feature amounts of a dimension, the smaller the calculated weight value. Because it is considered that a dimension whose variance in numerical values of a correct feature amount is large is unlikely to contribute to the correct discrimination, the effect on the search result is made to be small by making the weighting of such a dimension small. Next, the calculation unit 124, after obtaining a relative weighting using the Equation (3), performs by Equation (2) a normalization for obtaining a final weight value. Note that by further adding a query feature amount to a set of correct feature amounts, a configuration may be taken so as to consider the commonality between what is correct and a query.

In a case where both correct and incorrect were designated by the user, the calculation unit 124 is able to calculate the weight by using Equation (4) below which is a combination of Equation (1) and Equation (3), for example.

$$\text{w\_local}^i = \frac{\sum_{k=1}^{a}|\overline{p^i} - n_k^i|}{\sum_{k=1}^{b}(p_k^i - \overline{p^i})^2} \tag{4}$$

In step S509, the re-ranking unit 123 uses the similarity calculation scheme generated using a weighting vector in order to calculate a similarity of feature amounts between the query feature amount and the cross-referencing target. The re-ranking unit 123, in a case where the similarity is calculated by the generated similarity calculation scheme, may calculate the Euclidean distance between feature amounts after weighting the feature amounts and may directly calculate the distance using a weighted Euclidean distance. The re-ranking unit 123 is able to calculate by using Equation (5) below the weighted Euclidean distance between a query feature amount q and a feature amount x of the cross-referencing target, for example. According to Equation (5), because the weight of a dimension that is effective for discriminating between correct and incorrect becomes larger, in a case where the difference between the feature amounts of a dimension that is effective for discrimination is large, the distance is large (the similarity is small) and in a case where the difference between the feature amounts of a dimension that is effective for discrimination is small, the distance is small (the similarity is large). Also, because the weight is small for a dimension that is ineffective for discrimination, such a difference in the dimension is made unlikely to have an effect on the distance calculation result.

$$\text{dist}(q,x) = \sqrt{\sum_{i=1}^{d}(q^i - x^i)^2 \cdot w^i} \tag{5}$$

Next, the processing returns to step S504. The normal searching unit 117 obtains the highest ranking predetermined number (for example, 50 objects) of feature amounts of a high ranking similarity calculated in step S509 and then outputs to the display unit 110 the thumbnail image corresponding to the obtained feature amount.

Next, a description of re-search processing in steps S511 and S512 will be given. First, in step S511, the feedback searching unit 119 sets to the cross-referencing target the feature amount of the image in the search range designated in step S501. Also, in step S512, the feedback searching unit 119 calculates the similarity of the feature amounts of the query feature amount and the cross-referencing target using the similarity calculation scheme generated using the weighting vector calculated in the last re-ranking processing (that is, calculated in the last step S508). Next, the processing returns to step S504. The feedback searching unit 119 selects the highest ranking predetermined number (for example, 50 objects) of feature amounts of a high ranking similarity calculated in step S509 and then outputs to the display unit 110 the thumbnail image corresponding to the selected feature amount.

Note that a weight calculation method that can be used by the calculation unit 124 is not limited to the previously-described Equations (1) to (4). The calculation unit 124, in Equation (1), may use a difference ratio instead of an absolute value of difference between a query and incorrect, for example, or may set the weight to be calculated to two values, 0 or 1. In a case where the weight is set to two values, because a dimension whose weight is 0 does not contribute to the similarity at all, there is an effect of reducing the number of dimensions. That is, the amount of calculation can be reduced.

Also, in step S503, the normal searching unit 117 may save in the RAM 107 feature amounts and thumbnail images of a number (for example, 5000 objects) that is higher than the predetermined number (for example, 1000 objects) outputted as the re-ranking result. In such a case, the re-ranking unit 123 may perform a re-ranking using all of the feature amounts saved in the RAM and display on the display unit the thumbnail image of only the predetermined number outputted as the above-described re-ranking result. Because an error between a re-ranking and a re-search becomes small by virtue of such processing, it becomes possible to improve re-ranking accuracy. Here, no limitation is made in particular to the number of feature amounts or thumbnail images saved on the RAM 107 by the normal searching unit 117. The normal searching unit 117 may save in the RAM 107 as a feature amount of a re-ranking target the feature amount of a number that is a constant multiple (N times) (N>1) of the predetermined number in a case where a predetermined number of images are outputted as a re-ranking result, for example. Also, the normal searching unit 117 may save in the RAM 107 a cross-referencing target whose similarity is higher than a constant multiple (K times) (K<1) of the predetermined threshold in a case where a cross-referencing target whose similarity is higher than the predetermined threshold is outputted as a re-ranking result, for example.

By virtue of such a configuration, in a case where a feedback is designated by the user, it becomes possible to immediately confirm the effect of the feedback by re-ranking and displaying only the highly ranked of the last search results. Furthermore, by the re-search instruction being made when it is determined that the effectiveness of the feedback could be confirmed, it becomes possible to reduce the number of times that re-searching is conducted which requires a long processing time. Thus, it becomes possible to improve the convenience of a search by a user feedback.

Second Embodiment

Below, a description is given regarding the image searching apparatus according to a second embodiment. The image searching apparatus according to the first embodiment is configured so that the user instructs a re-search in a case where the user confirms the effect of the feedback and determines that the effectiveness of the feedback could be confirmed. However, there are cases where the effect of the feedback cannot be confirmed sufficiently by only confirming the highest ranking re-ranking result. For example, there are cases where the correct images are already collected in the highest ranking search result by the normal searching unit 117, and the result in the highest ranking does not change even though a re-ranking (re-search), after feedback from the user is provided, is executed.

From such a perspective, the effectiveness of the feedback is evaluated by a result evaluation unit 827 in the image searching apparatus according to the present embodiment. That is, whether sufficient feedback was provided for conducting a re-search is evaluated. In the present embodiment in particular, the result evaluation unit 827, by evaluating the re-ranking result, is able to evaluate whether a feedback that will be effective in a re-search was provided. The result evaluation unit 827, in a case where it is determined that an effective feedback was provided, may be configured so as to propose to the user to conduct a re-search by displaying the re-search button to be noticeable, making the re-search button active, and the like, for example. It becomes possible to prevent useless re-search from being conducted by the user conducting a re-search after confirming that effective feedback was provided. Thus, it becomes possible to improve the convenience of a search by a user feedback.

Figure 8A:
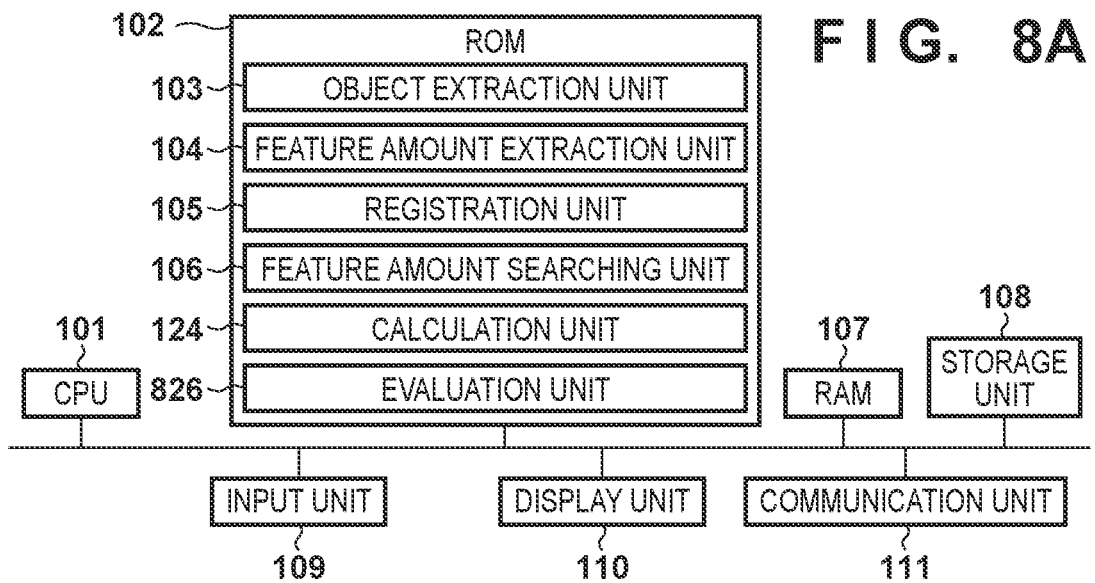
FIGS. 8A and 8B are views for illustrating an example of a functional configuration and a hardware configuration according to an embodiment.
Figure 8B:
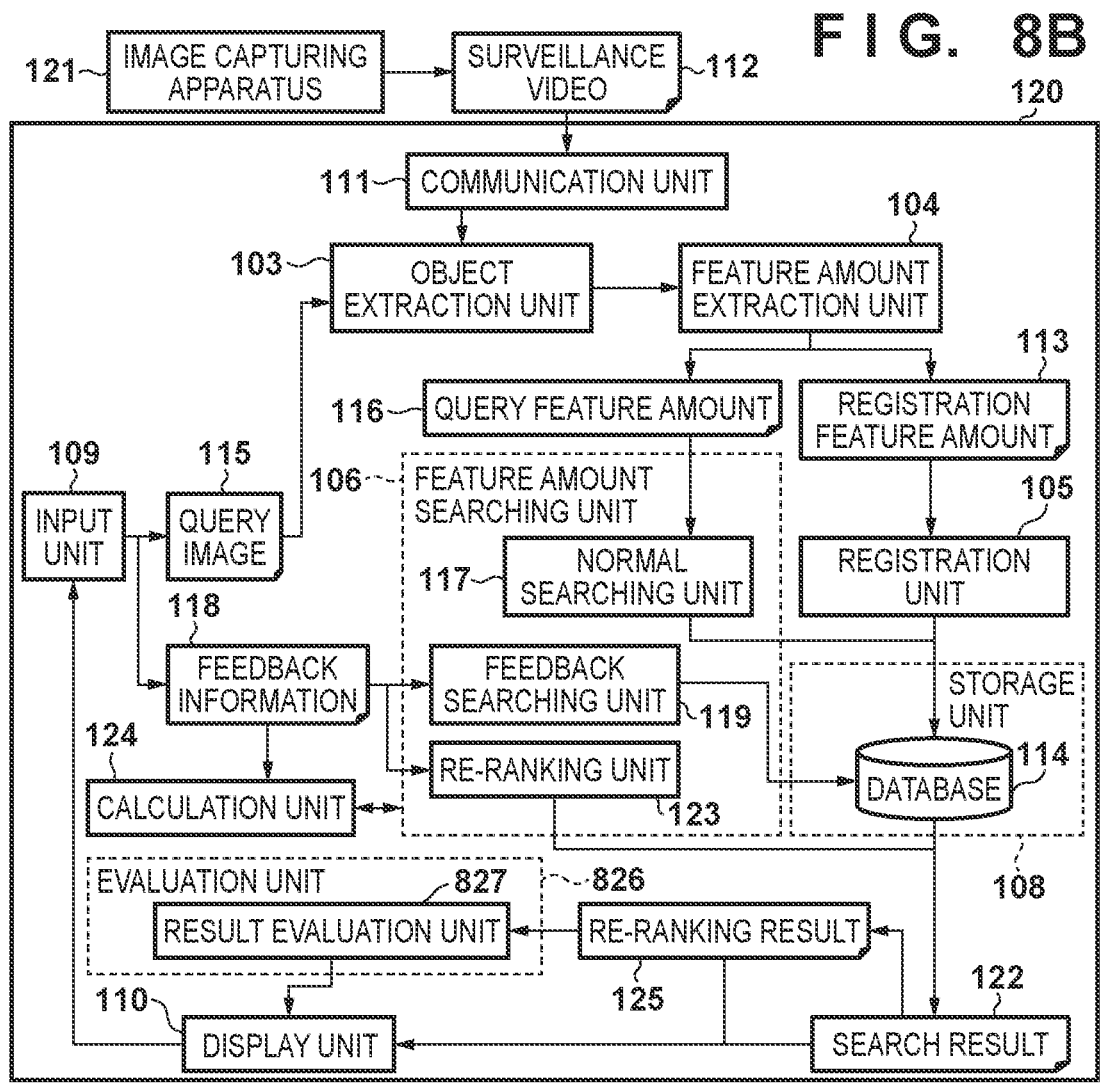

FIG. 8A is a block diagram for illustrating an example of a hardware configuration of the image searching apparatus according to the present embodiment. The image searching apparatus illustrated in FIG. 8A includes the same configuration as that of FIG. 1A except that an evaluating unit 826 is stored in the ROM 102, and thus, redundant description is omitted. Also, FIG. 8B is a block diagram illustrating an example of a dataflow of information processing performed by an image searching apparatus 820 according to the present embodiment and includes the same configuration as FIG. 1B aside from the result evaluation unit 827 being included as the evaluating unit 826, and thus, redundant description is omitted. In the present embodiment, the result evaluation unit 827, by evaluating the re-ranking result 125, evaluates whether a feedback that will be effective in a re-search was provided.

Figure 9:
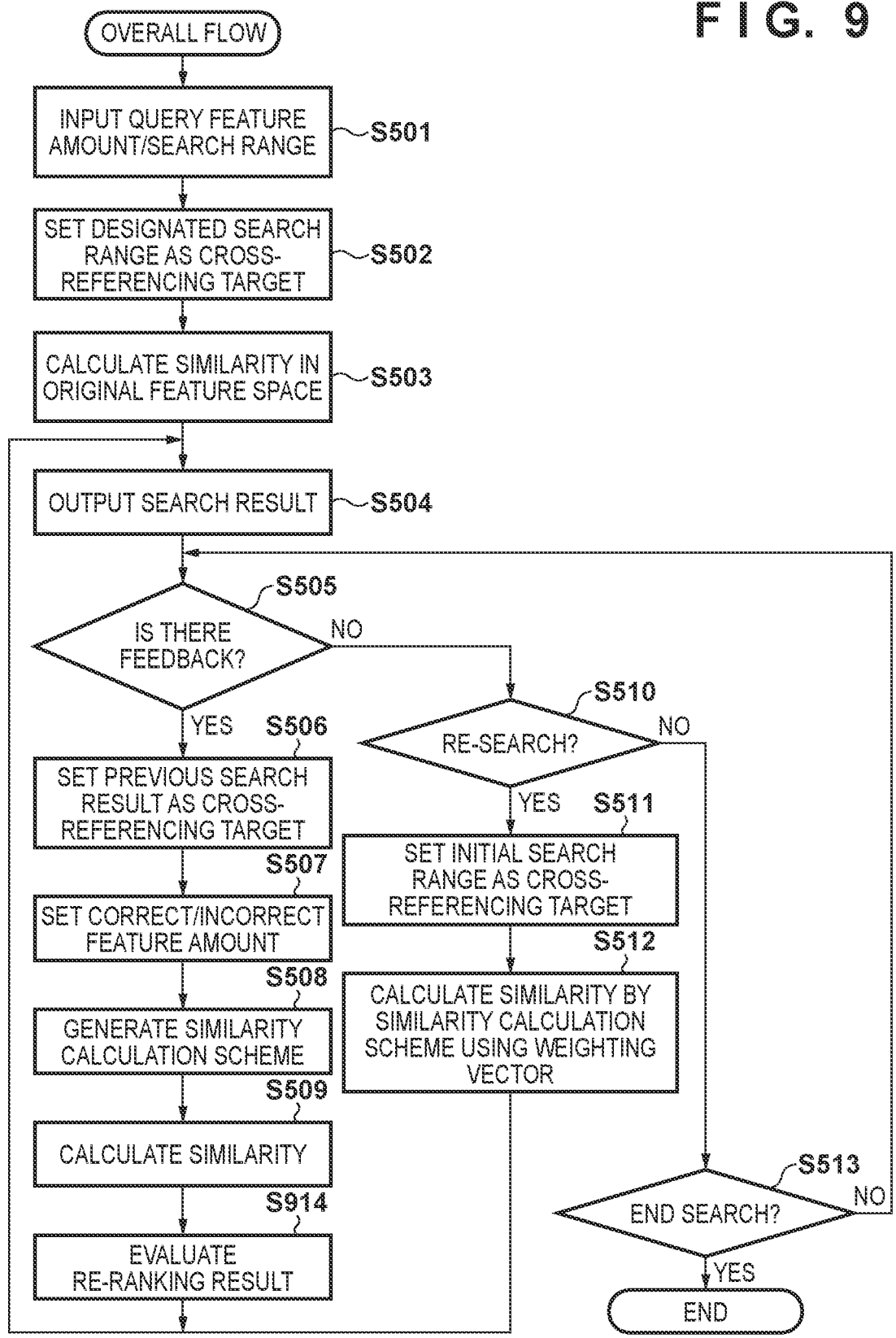
FIG. 9 is a flowchart for an example of processing in an image searching method according to an embodiment.

FIG. 9 is a flowchart illustrating an example of feature amount search processing performed by the image searching apparatus 820 according to the present embodiment. In the example illustrated in FIG. 9, the image searching apparatus 820 performs the same processing as that of FIG. 5 of the first embodiment aside from a step S914 for evaluating the effectiveness of feedback being performed after a similarity calculation.

In step S914, the result evaluation unit 827 evaluates the effectiveness of the feedback. The result evaluation unit 827 may determine, regarding each re-ranking target, whether the feedback is effective based on the relationship between the arrays when searching and after re-ranking, for example. Also, the result evaluation unit 827 may determine, regarding each re-ranking target, whether the feedback is effective based on the relationship between the similarities when searching and after re-ranking, for example. Furthermore, the result evaluation unit 827 may determine whether a feedback is effective based on a relationship between a distribution of similarities when searching (that is, before re-ranking) for a re-ranking target and a distribution of similarities when searching the high ranking results after re-ranking, for example. Below, description is given for each of the above three methods.

[1. A Method for Performing Determination Based on a Relationship of Arrays when Searching and after Re-Ranking]

In a case where there was a variation in the order of each search result when searching for a re-ranking target and after re-ranking, a switch may be caused in the order of an image that could not be detected in the previous search. It is estimated that when an image that could not be detected in the previous search could be detected in the re-search, in a case where variation in the order is small, the image is such that it appears in the lower ranking of the search result; however, in a case where the variation in the order is large, it may appear in the high ranking of the re-search result. Thus, in this example, the result evaluation unit 827, in a case where the variation amount in the order between when searching for a re-ranking target and after the re-ranking exceeds the predetermined threshold, determines that an effective feedback for a re-search was given.

As an example of a calculation method for a variation amount diff_rank in the order between when searching and after re-ranking, the result evaluation unit 827, in a case where the order of when searching for a re-ranking target is i and the order of after re-ranking is rerank$_i$, is able to use Equation (6) below.

$$\text{diff\_rank} = \Sigma_i |\text{rerank}_i - i| \quad (6)$$

Here, although the result evaluation unit 827, in order to calculate the variation amount in the order, adds all of the absolute values of differences in the order, no limitation is made in particular to this method. For example, the result evaluation unit 827 may add the absolute values of differences, as indicated in Equation (6), only for a re-ranking target whose rank was raised or only for a re-ranking target whose rank was lowered. Also, the result evaluation unit 827 may use only a re-ranking target whose rank is a high rank when searching or only a re-ranking target whose rank is a high rank after re-ranking, for example. Furthermore, a configuration may be taken so as to use only a re-ranking target for which the difference before/after re-ranking is large (for example, only a re-ranking target whose difference is the largest), for example. Also, although an absolute value of the sum of differences is calculated in Equation (6), a sum of squares of differences may be calculated instead.

Also, the result evaluation unit 827 determines that an effective feedback was provided when the calculated diff_rank is larger than the predetermined threshold. Here, no limitation is made in particular to a value set as the predetermined threshold. A value of the predetermined threshold may be set to a desired value in advance or decided dynamically based on the number of re-ranking targets from the perspective that diff_rank depends on the number of re-ranking targets, for example.

[2. A Method for Performing Determination Based on a Relationship of Similarities when Searching and after Re-Ranking]

In a case where there is a change in similarities of each re-ranking target due to a re-ranking, there is a possibility that by performing a re-search, a similarity of an image that could not be detected in a previous search changes thereby causing a switch in the order. Thus, in this example, the result evaluation unit 827, when the variation amount in the similarities between when searching and after the re-ranking exceeds the predetermined threshold, determines that an effective feedback was given.

As an example of a calculation method for a similarity variation amount diff$_{sim}$ between when searching and after re-ranking, the result evaluation unit 827 is able to use Equation (7) below. Here, the similarity when searching for a re-ranking target is sim_search$_i$, and the similarity after re-ranking is sim_rerank$_i$.

$$\text{diff}_{sim} = \max_i (\text{sim}_{search_i} - \text{sim}_{rerank_i}) - \max_i (\text{sim}_{rerank_i} - \text{sim}_{search_i}) \quad (7)$$

Here, although the result evaluation unit 827 extracts the similarity which increased the most and the similarity which decreased the most between before/after the re-ranking and sets their difference as the similarity variation amount diff$_{sim}$, no limitation is made in particular to the calculation method of a similarity variation amount. For example, the result evaluation unit 827 may set what has the largest absolute value in the difference in similarity as the similarity variation amount. Also, the result evaluation unit 827, by performing a calculation of the above Equation (7) using a predetermined number of similarities from the largest in difference of similarity, may perform a calculation of similarities.

Also, the result evaluation unit 827 determines that an effective feedback was provided in a case where the calculated diff$_{sim}$ is larger than the predetermined threshold. Here, no limitation is made in particular to a value set as the predetermined threshold. A value of the predetermined threshold may be set to a desired value in advance or decided dynamically based on the similarity when searching and the similarity after re-ranking from the perspective that diff$_{sim}$ depends on those values, for example.

[3. A Method for Performing Determination Based on the Relationship Between the Distribution of Similarities of when Searching for a Re-Ranking Target and the Distribution of Similarities of when Searching for High Ranking Results after Re-Ranking]

Some of the high ranking re-ranking results are highly likely to be included in the highly ranked re-search results. For example, in a case where the top 100 objects of a re-search result are all included in a re-ranking target, it is clear that the top 100 objects of a re-ranking result will coincide with the top 100 objects of the re-search result. That is, even if a re-search is performed, the re-search result will not change from the re-ranking result. How many objects will coincide between the highly ranked re-ranking results and the highly ranked re-search results depends on what kind of a feedback was provided.

In this example, the result evaluation unit 827, in a case where the relationship between the distribution of similarities when searching for a re-ranking target and the distribution of similarities when searching for the high ranking results after re-ranking satisfies the predetermined relationship, determines that effective feedback was provided. For example the result evaluation unit 827 evaluates, as the predetermined relationship described above, whether the distribution of similarity when searching for the high ranking results after re-ranking is sufficiently on the inner side of the distribution of similarity when searching for a re-ranking target. In a case where the distribution sufficiently falls on the inside, the high ranking results after re-ranking are highly unlikely to vary greatly even when a re-search is performed. That is, there is a high possibility that effective feedback has not been provided.

The normal searching unit 117 according to the present embodiment may obtain a number search results 122 that is larger than the number of the re-ranking results presented to the user, and the re-ranking unit 123 may perform re-ranking in relation to the obtained search result 122. That is, for example, in a case where the user desires to obtain 100 objects in a search result or a re-ranking result, the normal searching unit 117, internally, may save the top 5000 objects of a search result and then the re-ranking unit 123 may perform re-ranking targeting those 5000 objects. In such a case, the result evaluation unit 827, based on the distribution of similarity of the top 1000 objects among those for which re-ranking was performed, determines whether effective feedback was provided.

Figure 10B:
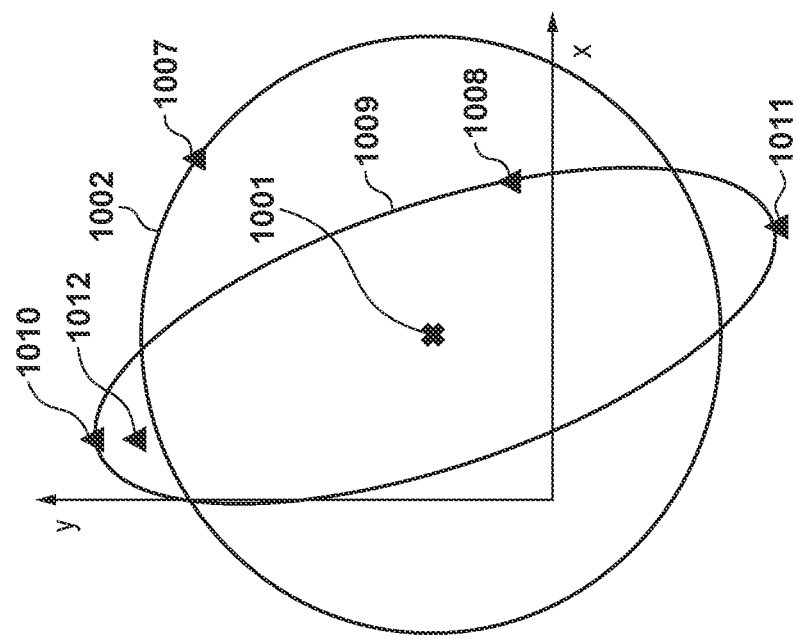
FIGS. 10A and 10B are views for illustrating examples of distributions of similarities in a feature space according to an embodiment.
Figure 10A:
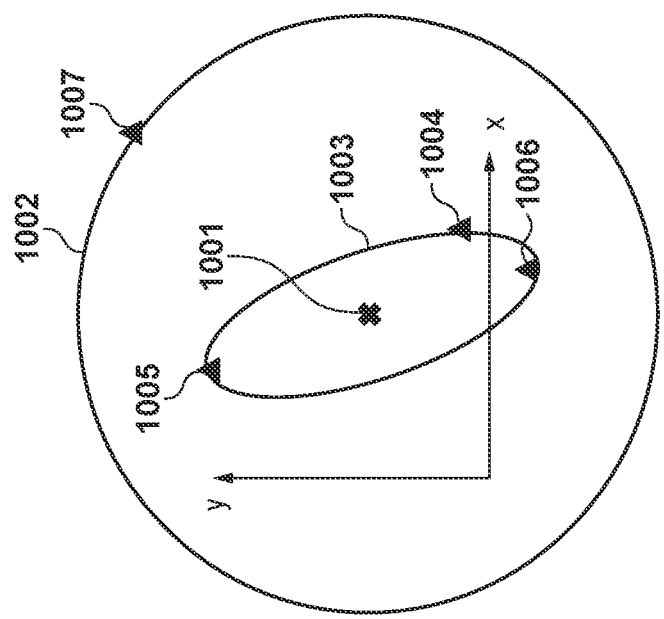

FIG. 10 is a view for describing in a feature space the relationship between a distribution of the similarity when searching for a re-ranking target and a distribution of the similarities when searching for the high ranking results after the re-ranking. No limitation is made in particular to the number of dimensions of a feature amount, and although it is assumed in practice to be greater than or equal to three dimensions, here, it is represented as two dimensions for the sake of descriptive convenience. A reference numeral 1001 in FIG. 10A is a feature amount of a query image. Note that as described above, the closer in distance a point is to the feature amount of a query image, the higher the similarity. A precise circle 1002 is a re-ranking range, which is a range of a feature amount of a re-ranking target (for example, the top 5000 objects of a search result), and in a case where the weighting vector w does not have a different weight for each dimension, it is a precise circle centered on a query image 1001. An ellipse 1003 is an example of feature amounts of the high ranking results (for example, the top 1000 objects of a re-ranking result) after re-ranking mapped in the same feature space, and because the weighting vector w has a weight for each dimension, it is an ellipse centered on the query image 1001.

Here, the result evaluation unit 827 obtains a feature amount of the minimum value of similarity among feature amounts of the high ranking results after re-ranking. In the example in FIG. 10A, the above-described feature amount is a reference numeral 1004. Next, the result evaluation unit 827 obtains the value of a feature amount whose similarity when searching is the minimum among feature amounts whose similarity after re-ranking is the same value as the reference numeral 1004. That is, the values of reference numerals 1005 and 1006 whose feature amounts are the furthest from the query image 1001 on the circumference of the ellipse 1003 are obtained. Because these feature amounts were obtained arithmetically by using a similarity calculation formula for points whose similarity is the minimum on the ellipse 1003 in the feature space, they are not necessarily present in the re-ranking targets. Furthermore, the result evaluation unit 827 calculates the similarity of the feature amounts of the reference numerals 1005 and 1006 when searching and sets their values as min_result.

Next, the result evaluation unit 827 obtains a minimum value min_rerank of similarity when searching for re-ranking target feature amounts. In the example in FIG. 10A, the result evaluation unit 827 obtains a feature amount 1007 on the circumference of the precise circle 1002. In a case where min_result is larger than min_rerank, the ellipse 1003 is within the precise circle 1002 and does not contact it as in FIG. 10A. At this time, it is ensured that the high ranking results after re-ranking fall within the re-ranking range. Thus, even if a re-search including those outside the re-ranking range is conducted, that is, even if a range that is wider than the precise circle 1002 was set as a search target, the re-search result will not change from the ellipse 1003.

Meanwhile, an example of a case where min_result is equal to or less than min_rerank is illustrated in FIG. 10B. An ellipse 1009 is an example of feature amounts of the high ranking results (for example, the top 1000 objects of a re-ranking result) after re-ranking mapped in the same feature space, and the precise circle 1002 is the same as FIG. 10A. In the example in FIG. 10B, a feature amount whose similarity is the minimum among feature amounts of the high ranking results after re-ranking is a feature amount 1008 on an ellipse 1009. Also, the feature amounts whose similarity when searching is the minimum among the feature amounts whose similarity after re-ranking is the same value as the reference numeral 1008 are feature amounts 1010 and 1011, and the value of these similarities is min_result. The result evaluation unit 827 obtains this min_result and the above-described min_rerank (that is, the feature amount 1007). In a case where min_result is smaller than min_rerank, the ellipse 1009 protrudes out from the precise circle 1002 as in FIG. 10B. At this time, a point 1012 present in a region protruding out from the precise circle 1002 is not detected in a re-ranking but is a feature amount that is estimated to be detected when re-searching including those outside the re-ranking range. Thus, the result evaluation unit 827 is able to determine that in such a case feedback that is effective for a re-search was provided.

Also, all of the results of the same value as min_result are not necessarily included in the re-ranking range (that is, the feature amounts on the precise circle 1002 is not necessarily a re-ranking target). Thus, in a case where min_result and min_rerank are equal, a new feature amount may be detected by a re-search. Thus, the result evaluation unit 827 may determine that also in such a case feedback that is necessary for a re-search was provided. Furthermore, the result evaluation unit 827 may determine that a feedback necessary for a re-search was provided when a difference of subtracting min_result from min_rerank is greater than or equal to the predetermined threshold. That is, in the example in FIG. 10B, it may be determined that a feedback that is necessary for a re-search was provided when the ellipse 1009 is sufficiently protruding out of the precise circle 1002. No limitation is made in particular to the threshold here and it may be set to a desired value as appropriate.

Also, there are cases where an index classified by clustering and the like is used in order to quickly achieve a search, and in such cases, there are times when results whose similarities are higher than min_rerank may not be included in the re-ranking range. Thus, the result evaluation unit 827 may not directly compare min_result and min_rerank but compare after multiplying min_rerank by a coefficient that is greater than 1.

Figure 11:
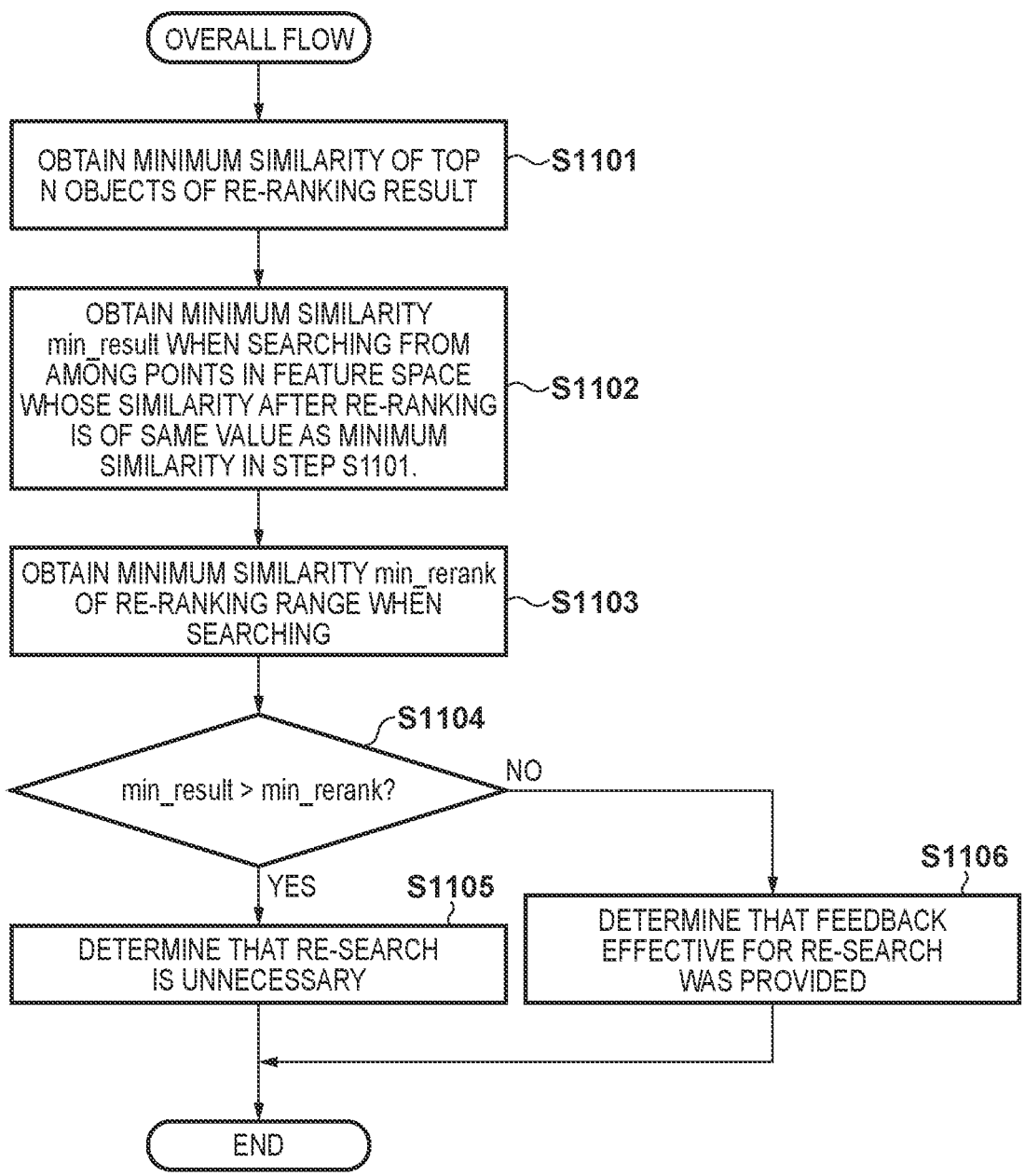
FIG. 11 is a flowchart for an example of evaluation processing in an image searching method according to an embodiment.

FIG. 11 is a flowchart illustrating an example of processing for evaluating a distribution of similarities by the result evaluation unit 827 according to the present embodiment. First, in step S1101, the result evaluation unit 827 obtains the minimum similarity among the top N objects of the re-ranking result (for example, 1000 objects). This is the similarity of the feature amount 1004 in FIG. 10A and also the similarity of the feature amount 1008 in FIG. 10B. In step S1102, the result evaluation unit 827 obtains a similarity whose similarity when searching is on the minimum point among the points in the feature space whose similarity after re-ranking is of the same value as the similarity obtained in in step S1101, and the similarity obtained here is min_result. This is the similarity of the feature amounts 1005 and 1006 in FIG. 10A and also the similarity of the feature amounts 1010 and 1011 in FIG. 10B. In step S1103, the result evaluation unit 827 obtains the minimum similarity of the re-ranking range (for example, 5000 objects) when searching, and the similarity obtained here is min_rerank. This is the similarity of the feature amount 1007 in FIG. 10A and FIG. 10B.

Next, in step S1103, the result evaluation unit 827 compares min_rerank and min_result. In a case where min_result is larger than min_rerank, that is, in a case where a state similar to what is illustrated in FIG. 10A, for example, the processing advances to step S1105. In step S1105, the result evaluation unit 827 determines that a re-search is unnecessary and then ends the present flow. Meanwhile, in a case where min_result is equal to or less than min_rerank, that is, in a case where a state similar to what is illustrated in FIG. 10B, for example, the processing advances to step S1106. In step S1106, the result evaluation unit 827 determines that a feedback that is effective for a re-search was provided and then ends the present flow.

In the example in FIG. 11, min_result based on a re-ranking result of 1000 objects and min_rerank based on a re-ranking range of 5000 objects are compared. However, no limitation is made in particular to the process of obtaining min_result as described above, and for example, the result evaluation unit 827 may be configured to reobtain min_result in accordance with a page that is being displayed. That is, on an apparatus that can display 50 objects per page, min_result may be obtained based on only 50 objects of a re-ranking result in a case where only the first page is being viewed or based on 100 objects of a re-ranking result in a case where up to the second page was viewed. In such cases, min_result becomes larger every time a page is turned. The result evaluation unit 827 may change the re-search button to a noticeable display when min_result exceeds min_rerank. Also, it is estimated that in a case where a re-search is performed when min_result exceeds min_rerank, the re-search result of up to the page immediately before the page that was being viewed does not change from the re-ranking result. Thus, in such a case, the result evaluation unit 827 may start the display of the re-ranking result from the page that was being viewed.

The result evaluation unit 827 may perform an evaluation by conducting one of the above three methods or may perform a comprehensive evaluation by conducting a plurality among them. For example, the first method for determining by a variation amount in the order may not function correctly in a case where there is a bias in the initial search result in a feature space. That is, there are cases where the first method may not function correctly in a case where although the variation in the order of high ranking search results is small, the variation in similarity is likely to be large. In such a case, the second method for determining by the variation in similarity is effective. Conversely, there are cases where even if the order changes, the similarities do not change much. In such cases, the first method is effective. Also, the result evaluation unit 827, in a case where the condition of either of the first method or the second method is met, may determine that a feedback that is effective for a re-search was provided.

The third method of using the distribution of similarities is a method that is able to ensure that the order after re-ranking and the order of a re-search is the same. The result evaluation unit 827 may use together the first method and the second method when it cannot be ensured that the order after re-ranking and the order of a re-search is the same.

The result evaluation unit 827 according to the present embodiment, by evaluating the re-ranking result, determines whether a feedback that will be effective in a re-search was provided. The result evaluation unit 827 may perform a presentation of the effectiveness when it determines that an effective feedback was provided. For example, the result evaluation unit 827 may display the re-search button to be noticeable or make the re-search button active in order to perform the presentation of the effectiveness. Also, the result evaluation unit 827 may display the level of effectiveness in a form where data is visualized, such as a bar display. The user is able to prevent useless re-search from being conducted by conducting a re-search after confirming the presentation of the effectiveness by the result evaluation unit.

According to such a configuration, even in a case where the effectiveness of a feedback cannot be evaluated only by visually confirming a re-ranking result, the effect of a user feedback can be confirmed based on the evaluation by the result evaluation unit 827. Thus, it becomes possible to improve the convenience of a search by a user feedback.

Note that because the image searching apparatus 820 according to the present embodiment includes a configuration for determining the effect of feedback, it is not particularly necessary to display on the display unit 110 in order to make the user confirm the re-ranking result 125. Also, the user may give an instruction to conduct a re-search after confirming the display of a re-search button or the like or the image searching apparatus 820 may be configured to conduct a re-search automatically when determining that a feedback is effective. Furthermore, the image searching apparatus 820, in a case where it determines that a feedback is effective, may be configured to conduct a re-search in the background and by displaying a re-search result when a re-search instruction from a user is obtained, reduce the perceived response time.

Third Embodiment

Below, a description is given regarding the image searching apparatus according to a third embodiment. The image searching apparatus according to the second embodiment, by evaluating the re-ranking result, determined whether a feedback that is effective for a re-search was provided. The image searching apparatus according to the present embodiment, based on an evaluation parameter used for calculating a similarity, evaluates the effectiveness of feedback. That is, it can determine, by evaluating the similarity calculation scheme, whether a feedback that is effective for a re-search was provided. Thus, the image searching apparatus according to the present embodiment is able to perform an evaluation of the effectiveness of feedback without performing a re-ranking based on how a similarity changes.

The re-ranking unit 123 according to the first and second embodiments obtained the feedback information by the user designating a correct or incorrect image from among the search results. Next, the re-ranking unit 123 generated the similarity calculation scheme based on the commonality between feature amounts of feedback information and a query image. A correct or incorrect image used by the image searching apparatus according to the present embodiment is provided from among held images instead of being selected from among the search results. That is, the image searching apparatus according to the present embodiment, by being provided in advance with a correct image whose appearance is not similar or an incorrect image whose appearance is similar, for example, is able to generate a similarity calculation scheme based on the commonality between the feature amounts of the image thereof and the query image. Thus, it becomes possible to conduct a search that emphasizes a portion with a feature from the initial search by using the similarity calculation scheme generated here.

Figure 12:
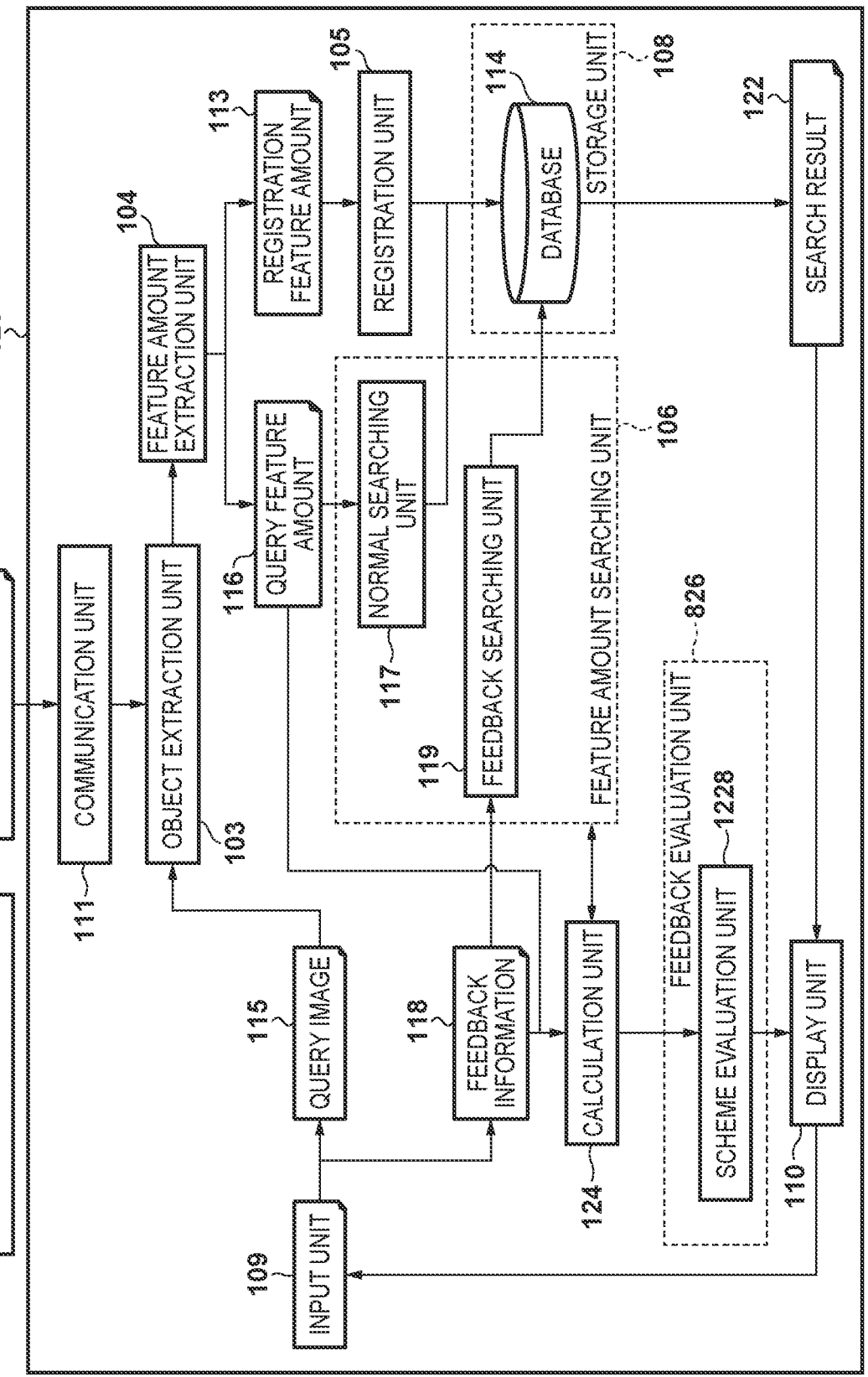
FIG. 12 is a view for illustrating an example of a functional configuration and a hardware configuration according to an embodiment.

An example of a hardware configuration of the image searching apparatus according to the present embodiment is the same as FIG. 8A. FIG. 12 is a block diagram illustrating an example of a dataflow of information processing performed by the image searching apparatus according to the present embodiment. FIG. 12 has the same configuration as FIG. 8B aside from the re-ranking unit 123 and the re-ranking result 125 being removed and that it has a scheme evaluation unit 1228 as the evaluating unit 826 in place of the result evaluation unit 827, and thus, redundant description is omitted. In the present embodiment, the scheme evaluation unit 1228, by evaluating the similarity calculation scheme, evaluates whether a feedback that will be effective in a re-search was provided. That is, the re-ranking processing that was executed in the first and the second embodiments are unnecessary.

Figure 13:
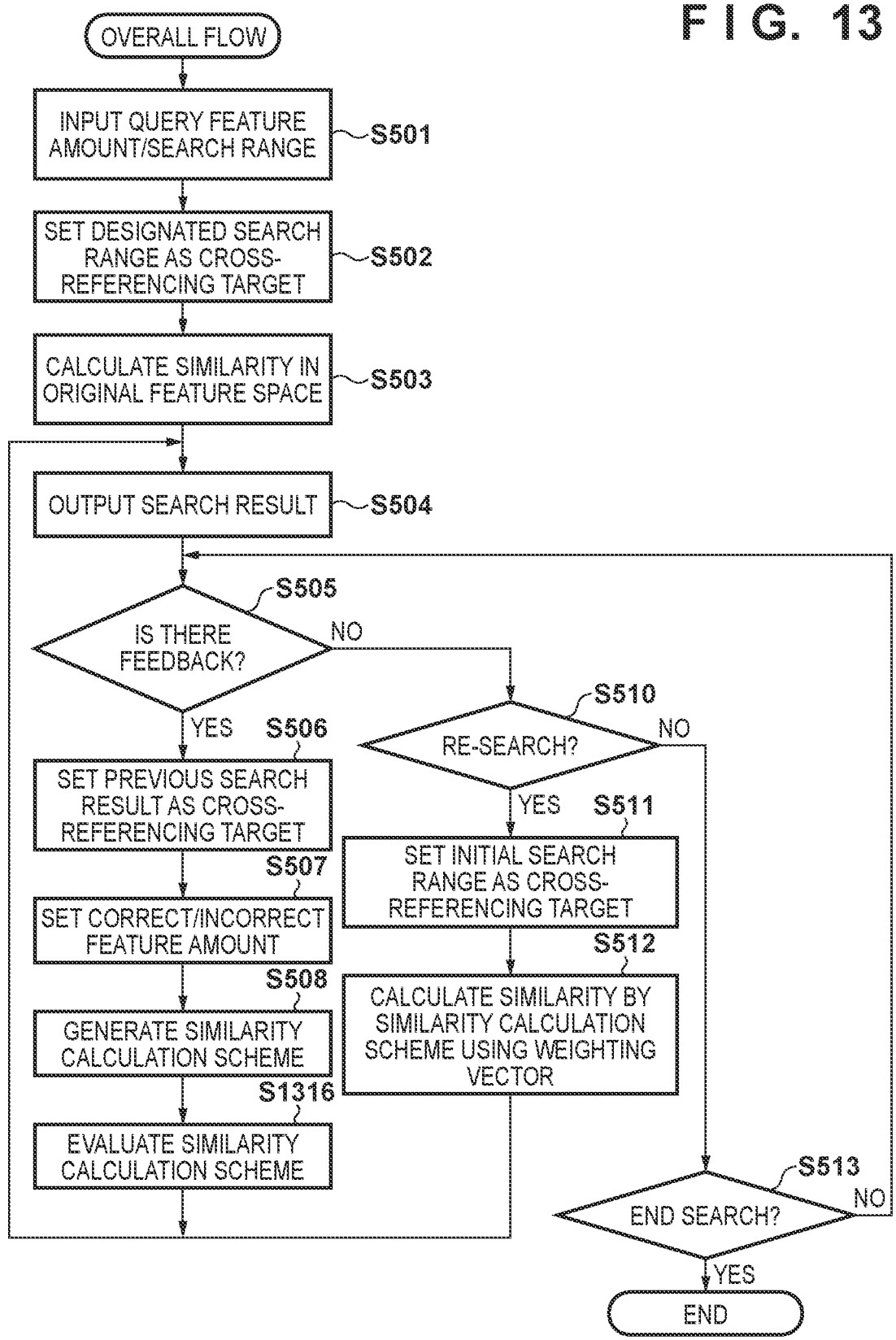
FIG. 13 is a flowchart for an example of processing in an image searching method according to an embodiment.

FIG. 13 is a flowchart for illustrating an example of feature amount search processing that is performed by the image searching apparatus according to the present embodiment. In FIG. 13, the same processing is performed as in FIG. 9 aside from step S1316 being executed in place of step S914, and thus, redundant description is omitted. Below, a description of an example of an evaluation method that is performed in step S1316 is given.

It is considered that in a case where the variation of the weight for each dimension of the weighting vector that was generated in step S508 is large, there is a change in the similarity and that the similarity of an image that could not be detected in a previous search will also change. Thus, the scheme evaluation unit 1228 determines that in such a case feedback that is effective for a re-search was provided.

In step S1316, the scheme evaluation unit 1228 is able to use Equation (8) below as an example of a method for calculating a variation diff_weight in a weight for each dimension of a weighting vector. Here, regarding the weighting vector, the weight of each dimension is $w^i$, and the variation in the weight of each dimension of the weighting vector, which is an average w of the weight of each dimension, is w'. In Equation (8), a sum of squared deviation of the weight of each dimension is calculated as a variation in weights; however, the maximum value of the weight of each dimension may be a variation in weights.

$$\text{diff\_weight} = \Sigma_{i=1}^{d}(w_i - w')^2 \quad (8)$$

The scheme evaluation unit 1228 is able to determine that an effective feedback was provided in a case where diff_weight is larger than the predetermined threshold, for example. Also, the scheme evaluation unit 1228 may determine whether the weight of each dimension exceeds the predetermined threshold and then evaluate whether an effective feedback was provided based on the number of dimensions that exceed the predetermined threshold. Although it is assumed here that each value of the predetermined threshold is provided in advance, no limitation is made in particular to those values.

Note that the image searching apparatus according to the present embodiment, in a case where it determines whether an effective feedback was provided using the weight of each dimension, does not need to perform a re-ranking. Thus, it is possible to perform the above-described determination after step S508. The scheme evaluation unit 1228, when it determines that an effective feedback was provided, may perform the presentation of its effectiveness similarly to the result evaluation unit 827 in the second embodiment. That is, it becomes possible to display the re-search button to be noticeable or make the re-search button active based on the determination in step S1316.

In the present embodiment, by using the similarity calculation scheme based on a correct or incorrect image that was provided in advance, a search that emphasizes a portion with a feature was performed starting from the initial search. Meanwhile, a correct or incorrect image may not be provided in advance similarly to the first and the second embodiment. In such a case, it is possible to use the preset similarity calculation scheme as described above in the initial search, and it is possible to use an initial state weighting vector, for example. The initial state weighting vector is provided in advance, and no limitation is made in particular to its value. As a concrete example, each element of the initial state weighting vector may have an equal value (for example, wi=1). In such a case, the scheme evaluation unit 1228, in a case where the weighting coefficient ceases to be flat, may determine that a feedback that is effective for a re-search was provided. For example, the scheme evaluation unit 1228, in a case where the distribution of the weighting coefficient of each dimension that was obtained in step S508 exceeds the predetermined threshold, may determine that a feedback that is effective for a re-search was provided. Although it is assumed here that the value of the predetermined threshold is provided in advance, no limitation is made in particular to those values.

According to such a configuration, it becomes possible, by evaluating the similarity calculation scheme, to determine whether a feedback that is effective for a re-search was provided. Thus, it becomes possible, by evaluating how similarities change, to prevent useless re-search from being conducted without performing a re-ranking.

Also, the image searching apparatus according to the present embodiment may perform an evaluation using the evaluation method described in the second embodiment. That is, it may be determined whether an effective feedback was provided by using together the evaluation of the re-ranking result and the evaluation of the similarity calculation scheme.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-21556, filed Nov. 28, 2019, which is hereby incorporated by reference herein in its entirety.

What is claimed is:

1. An image searching apparatus comprising a computer executing instructions to cause the computer to function as:
  a searching unit configured to search a plurality of search target images for an image relating to a query image based on a first similarity between the query image and each of the plurality of the search target images, and to rank a part of the plurality of search target images, wherein the first similarity is estimated by a first evaluation scheme;

a first obtaining unit configured to obtain a feedback indicating at least one of correct or incorrect regarding the image searched by the searching unit;

a second obtaining unit configured to obtain an evaluation of an effect of changing a similarity evaluation scheme from the first evaluation scheme to a second evaluation scheme by re-ranking the part of the plurality of search target images based on a second similarity between the query image and the search target image and the second similarity is estimated by the second evaluation scheme generated based on the feedback; and a control unit configured to control, in accordance with the evaluation, whether to perform a search for the image from the plurality of search target images for the image relating to the query image based on the second similarity, wherein the second obtaining unit, when evaluating that the effect is effective, displays information for proposing to a user the search from the plurality of search target images for the image relating to the query image based on the second similarity.

2. The image searching apparatus according to claim 1, wherein the first obtaining unit presents a user with a first image group, which is the part of the plurality of search target images ranked in accordance with the first similarity, and obtains the feedback from the user regarding at least one image among the first image group, wherein the second obtaining unit calculates the second similarity regarding each of the part of the plurality of search target images and presents the user with a second image group, which is the part of the plurality of search target images re-ranked in accordance with the second similarity, and wherein the second obtaining unit, regarding the second image group, performs the evaluation of the effect based on a relationship between an array in accordance with the first similarity and an array in accordance with the second similarity.

3. The image searching apparatus according to claim 2, wherein the first obtaining unit displays the user with the first image group, which is some of the plurality of search target images selected in accordance with the first similarity, and obtains the feedback from the user regarding the at least one image among the first image group displayed in a first array, and wherein the first image group is displayed to the user in the first array in a descending order of the first similarity at a time of a search according to the first evaluation scheme.

4. The image searching apparatus according to claim 2, wherein the second obtaining unit displays in a second array in accordance with the second similarity at least some of the second image group and obtains as the evaluation of the effect an evaluation from the user in relation to the second array, and wherein at least some of the second image group is displayed to the user in a second array different from a first array in a descending order of the second similarity after the first obtaining unit obtains the feedback.

5. The image searching apparatus according to claim 4, wherein the second obtaining unit, every time the first obtaining unit obtains a feedback, displays in an array in accordance with the similarity, which was evaluated in accordance with the feedback, the at least some of the second image group.

6. The image searching apparatus according to claim 4, wherein the second obtaining unit, in accordance with an instruction from the user, displays in an array in accordance with the similarity, which was evaluated in accordance with the feedback, the at least some of the second image group.

7. The image searching apparatus according to claim 2, wherein the second obtaining unit, regarding an image that is included in the second image group, performs the evaluation of the effect based on a variation amount between an order in the second image group in accordance with the first similarity and an order in the second image group in accordance with the second similarity.

8. The image searching apparatus according to claim 2, wherein the second obtaining unit, regarding the second image group, performs the evaluation of the effect based on a relationship between the first similarity and the second similarity.

9. The image searching apparatus according to claim 8, wherein the second obtaining unit, regarding an image that is included in the second image group, performs the evaluation of the effect based on a variation amount between the first similarity and the second similarity.

10. The image searching apparatus according to claim 2, wherein the second obtaining unit performs the evaluation of the effect based on a relationship between a distribution of the first similarity included in the first image group or the second image group and a distribution of the first similarity included in a third image group in which the second similarity is larger in the second image group.

11. The image searching apparatus according to claim 10, wherein the second obtaining unit performs the evaluation of the effect based on whether or not the distribution of the first similarity included in the third image group falls inside the distribution of the first similarity included in the second image group.

12. The image searching apparatus according to claim 2, wherein the second obtaining unit performs the evaluation of the effect based on an evaluation parameter that is used in the second evaluation scheme.

13. The image searching apparatus according to claim 2, wherein the second obtaining unit presents the user with a result of the evaluation of the effect.

14. The image searching apparatus according to claim 1, wherein
the first obtaining unit further obtains an instruction to cancel the feedback, and
the second obtaining unit, in accordance with the feedback that is not canceled, obtains the evaluation of the effect that is provided to the search result of the image by changing the similarity evaluation scheme to the second evaluation scheme from the first evaluation scheme.

15. The image searching apparatus according to claim 1, wherein the second obtaining unit, based on the feedback, decides a weight, which is used for calculating the second similarity, of each dimension of a feature amount included in the image.

16. The image searching apparatus according to claim 1, wherein the control unit performs the search of the plurality of search target images for the image relating to the query image based on the second similarity to the query image by the second evaluation scheme when a variation amount in the similarities between the first similarity and the second similarity exceeds a predetermined threshold.

17. An image searching method comprising:
    searching a plurality of search target images for an image relating to a query image based on a first similarity between the query image and each of the plurality of the search target images, and ranking a part of the plurality of search target images, wherein the first similarity is estimated by a first evaluation scheme;
    obtaining a feedback indicating at least one of correct or incorrect regarding the searched image;
    obtaining an evaluation of an effect of changing a similarity evaluation scheme from the first evaluation scheme to a second evaluation scheme by re-ranking the part of the plurality of search target images, based on a second similarity between the query image and the search target image and the second similarity is estimated by the second evaluation scheme generated based on the feedback; and
    controlling, in accordance with the evaluation, whether to perform a search for the image from the plurality of search target images for the image relating to the query image based on the second similarity,
    wherein the obtaining, when evaluating that the effect is effective, displays information for proposing to a user the search from the plurality of search target images for the image relating to the query image based on the second similarity.

18. A non-transitory computer-readable storage medium storing a program which, when executed by a computer comprising a processor and a memory, causes the computer to:
    search a plurality of search target images for an image relating to a query image based on a first similarity between the query image and each of the plurality of the search target images, and ranking a part of the plurality of search target images, wherein the first similarity is estimated by a first evaluation scheme;
    obtain a feedback indicating at least one of correct or incorrect regarding the searched image;
    obtain an evaluation of an effect of changing a similarity evaluation scheme from the first evaluation scheme to a second evaluation scheme by re-ranking the part of the plurality of search target images based on a second similarity between the query image and the search target image and the second similarity is estimated by the second evaluation scheme generated based on the feedback; and
    control, in accordance with the evaluation of the effect, whether to perform a search for the image from the plurality of search target images for the image relating to the query image based on the second similarity,
    wherein the obtain, when evaluating that the effect is effective, displays information for proposing to a user the search from the plurality of search target images for the image relating to the query image based on the second similarity.

* * * * *